US010590548B1

(12) United States Patent
McGinnis

(10) Patent No.: US 10,590,548 B1
(45) Date of Patent: Mar. 17, 2020

(54) METHODS AND SYSTEMS FOR FUEL PRODUCTION

(71) Applicant: Prometheus Fuels, Inc, San Mateo, CA (US)

(72) Inventor: Robert McGinnis, San Mateo, CA (US)

(73) Assignee: Prometheus Fuels, Inc, Santa Cruz, CA (US)

(*) Notice: Subject to any disclaimer, the term of this patent is extended or adjusted under 35 U.S.C. 154(b) by 0 days.

(21) Appl. No.: 16/503,165

(22) Filed: Jul. 3, 2019

Related U.S. Application Data

(60) Provisional application No. 62/781,149, filed on Dec. 18, 2018.

(51) Int. Cl.
*C25B 3/04* (2006.01)
(52) U.S. Cl.
CPC ..................................... *C25B 3/04* (2013.01)
(58) Field of Classification Search
CPC ....................................................... C25B 3/04
USPC ................................................. 205/413, 450
See application file for complete search history.

(56) References Cited

U.S. PATENT DOCUMENTS 8,617,394 B2 12/2013 Ratto et al.
9,095,821 B1 8/2015 Ratto et al.

FOREIGN PATENT DOCUMENTS

WO WO-2015161310 A2 10/2015
WO WO-2017197167 A1 11/2017

OTHER PUBLICATIONS

Narayanan et al., "Electrochemical Conversion of Carbon Dioxide to Formate in Alkaline Polymer Electrolyte Membrane Cells," Journal of the Electrochemical Society (2011), vol. 158, No. 2, pp. A167-A173. (Year: 2011).*
Wang et al., "Efficient Electrocatalytic Reduction of CO2 by Nitrogen-Doped Nanoporous Carbon/Carbon Nanotube Membranes—A Step towards the Electrochemical CO2 Refinery," Agnew Chem. Int. Ed. (2017), vol. 56, pp. 7847-7852. (Year: 2017).*
Wang et al., "Nitrogen-Doped Nanoporous Carbon Membranes with Co/CoP Janus-Type Nanocrystals as Hydrogen Evolution Electrode in Both Acidic and Alkaline Environments," ACS Nano (2017), vol. 11, pp. 4358-4364. (Year: 2017).*
Ismail et al, "Transport and Separation Properties of Carbon Nanotube-Mixed Matrix Membrane," Separation and Purification Technology (2009), vol. 70, pp. 12-26. (Year: 2009).*

(Continued)

*Primary Examiner* — Edna Wong
(74) *Attorney, Agent, or Firm* — Wilson Sonsini Goodrich & Rosati

(57) ABSTRACT

The present disclosure provides systems and methods for producing carbon products via electrochemical reduction from fluid streams containing a carbon-containing material, such as, for example, carbon dioxide. Electrochemical reduction systems and methods of the present disclosure may comprise micro- or nanostructured membranes for separation and catalytic processes. The electrochemical reduction systems and methods may utilize renewable energy sources to generate a carbon product comprising one or more carbon atoms (C1+ product), such as, for example, fuel. This may be performed at substantially low (or nearly zero) net or negative carbon emissions.

29 Claims, 15 Drawing Sheets

(56) References Cited

OTHER PUBLICATIONS

Choi et al., "Electrochemical Reduction of Carbon Dioxide to Formate on Tin-Lead Alloys," ACS Sustainable Chem. Eng. (2016), vol. 4, pp. 1311-1318. (Year: 2016).*
Cheng et al., "Photoelectrocatalytic Reduction of CO2 into Chemicals Using Pt-Modified Reduced Graphene Oxide Combined with Pt-Modified TiO2 Nanotuibes," Environ. Sci. Technol. (2014), vol. 48, pp. 7076-7084. (Year: 2014).*
Andrews, R. Separation of CO2 from flue gases by carbon-multiwall carbon nanotube membranes. National Energy Technology Laboratory (NETL), Pittsburgh, PA, Morgantown, WV, and Albany, OR (United States); Nov. 1, 2001. Abstract is available at https://www.osti.gov/biblio/792162; Accessed on Jul. 8, 2019.
Du, et al. Absorption and Structural Property of Ethanol/Water Mixture with Carbon Nanotubes. Chinese Journal of Chemical Physics 25, 487-493 (2012).
Dunwell, et al. The Central Role of Bicarbonate in the Electrochemical Reduction of Carbon Dioxide on Gold. J Am Chem Soc. Mar. 15, 2017;139(10):3774-3783. doi: 10.1021/jacs.6b13287. Epub Mar. 6, 2017.
Li, et al. Metal-free Nanoporous Carbon as a Catalyst for Electrochemical Reduction of CO2 to CO and CH4. ChemSusChem. Mar. 21, 2016;9(6):606-16. doi: 10.1002/cssc.201501575. Epub Feb. 2, 2016.
Liu, et al. Pyrrolic-nitrogen doped graphene: a metal-free electrocatalyst with high efficiency and selectivity for the reduction of carbon dioxide to formic acid: a computational study. Phys Chem Chem Phys. Feb. 21, 2016;18(7):5491-8. doi: 10.1039/c5cp07458d.
McGinnis, et al. Large-scale polymeric carbon nanotube membranes with sub-1.27-nm pores. Sci Adv. Mar. 9, 2018;4(3):e1700938. doi: 10.1126/sciadv.1700938. eCollection Mar. 2018.
Ong, et al. Graphene oxide as a structure-directing agent for the two-dimensional interface engineering of sandwich-like graphene-g-C3N4 hybrid nanostructures with enhanced visible-light photoreduction of CO2 to methane. Chem Commun (Camb). Jan. 18, 2015;51(5):858-61. doi: 10.1039/c4cc08996k. Epub Nov. 27, 2014.
PCT/US2017/032239 International Search Report and Written Opinion dated Aug. 4, 2017.
Service, Robert F. This former playwright aims to turn solar and wind power into gasoline. ScienceMag.org. Jul. 3, 2019. Avalable at https://www.sciencemag.org/news/2019/07/former-playwright-aims-turn-solar-and-wind-power-gasoline; accessed on Jul. 8, 2019.
Song, et al. High-Selectivity Electrochemical Conversion of CO2 to Ethanol using a Copper Nanoparticle/N-Doped Graphene Electrode. ChemistrySelect. vol. 1, Issue19, Nov. 16, 2016, pp. 6055-6061.
Wang, et al. CO2 Hydrogenation to Formate and Methanol as an Alternative to Photo- and Electrochemical CO2 Reduction. Chem Rev. Dec. 9, 2015;115(23):12936-73. doi: 10.1021/acs.chemrev.5b00197. Epub Sep. 3, 2015.
Wang, et al. Efficient Electrocatalytic Reduction of CO2 by Nitrogen-Doped Nanoporous Carbon/Carbon Nanotube Membranes: A Step Towards the Electrochemical CO2 Refinery. Angew Chem Int Ed Engl. Jun. 26, 2017;56(27):7847-7852. doi: 10.1002/anie.201703720. Epub Jun. 1, 2017.

\* cited by examiner

METHODS AND SYSTEMS FOR FUEL PRODUCTION

CROSS-REFERENCE

This application claims the benefit of U.S. Provisional Patent Application No. 62/781,149, filed Dec. 18, 2018, which is entirely incorporated herein by reference for all purposes.

BACKGROUND

There is an increasing level of carbon-containing compounds, such as carbon monoxide (CO) and carbon dioxide ($CO_2$), in the atmosphere. Such increase in level of carbon-containing compounds may be adversely impacting the global temperature, leading to global warming.

SUMMARY

Recognized herein is an increased need for efficient methods of producing fuels and other chemical commodities from non-petroleum sources. Such processes may utilize carbon monoxide (CO) and/or carbon dioxide ($CO_2$) as a carbon-source for the production of organic molecules to minimize the carbon footprint of the production and consumption of the produced fuels and chemicals. The production of durable chemical products (e.g., polymers) may even create net carbon sinks for products produced using atmospheric carbon monoxide and/or carbon dioxide.

In an aspect, provided is a method for using a carbon-containing material to generate a carbon product comprising one or more carbon atoms (C1+ product), comprising: (a) directing an electrolyte solution comprising the carbon-containing material into an electrochemical system comprising (i) an anode, (ii) a cathode, and (iii) a micro- or nanostructured membrane, to bring the electrolyte solution in contact with the cathode, wherein the anode and/or cathode are associated with a catalyst(s), and wherein the anode and the cathode are in electrical communication with one another through the electrolyte; (b) reducing the carbon-containing material in the electrolyte solution, using the cathode, to generate the C1+ product; and (c) recovering the C1+ product from the electrochemical system using the micro- or nanostructured membrane.

In some embodiments, the carbon-containing material comprises carbon monoxide (CO) and/or carbon dioxide ($CO_2$).

In some embodiments, the cathode comprises the catalyst(s).

In some embodiments, the anode comprises the catalyst(s).

In some embodiments, the electrolyte solution comprises an aqueous species resulting from an interaction of the carbon-containing material with water. In some embodiments, the aqueous species comprises one or more members selected from the group consisting of bicarbonate ions, carbonate ions, and formate ions.

In some embodiments, the method further comprises, prior to (b), introducing the carbon-containing material to water using a gas contactor. In some embodiments, the gas contactor comprises a membrane. In some embodiments, the membrane comprises one or more nanomaterials selected from the group consisting of carbon nanotubes, carbon nanospheres, carbon nano-onions, graphene, and porous pyrolyzed carbon.

In some embodiments, the micro- or nanostructured membrane comprises one or more materials selected from the group consisting of carbon nanotubes, carbon nanospheres, carbon nano-onions, graphene, and porous pyrolyzed carbon.

In some embodiments, the micro- or nanostructured membrane further comprises a catalyst. In some embodiments, the catalyst comprises metal nanoparticles. In some embodiments, the metal nanoparticles comprise a metal selected from the group consisting of copper, nickel, platinum, iridium, ruthenium, palladium, tin, silver, and gold.

In some embodiments, the catalyst(s) is N-doped.

In some embodiments, the anode and the cathode are in electrical communication with a voltage source, wherein the voltage source comprises a renewable power source. In some embodiments, the renewable power source comprises one or members selected from the group consisting of photovoltaic power, wind power, geothermal power, hydroelectric power, tidal power, and nuclear power.

In some embodiments, the method further comprises introducing the carbon-containing material to the electrochemical system by using hydroxides generated electrochemically.

In some embodiments, the cathode operates at a temperature of about 10° Celsius (C) to 40° C.

In some embodiments, the C1+ product is recovered from the electrochemical reduction system in absence of a distillation unit.

In some embodiments, the electrochemical system further comprises an ion exchange membrane configured to minimize a distance between the cathode and the anode.

In some embodiments, the C1+ product is recovered from the electrochemical reduction system at a single pass selectivity of at least about 70%.

In some embodiments, the cathode comprises pores with pore sizes of no more than about 5 microns.

In some embodiments, the C1+ product comprises one or more members selected from the group consisting of methanol, ethanol, propanol, and butanol.

Another aspect of the present disclosure provides a method for using a carbon-containing material to generate a reduced carbon product comprising one or more carbon atoms (C1+ product), comprising: (a) directing an electrolyte solution comprising the carbon-containing material into an electrochemical system comprising an anode and a cathode comprising or being associated with catalysts; (b) using the cathode to reduce the carbon containing material to the C1+ product in the electrolyte solution, and (c) recovering the C1+ product from the electrochemical reduction system with the aid of a micro- or nanostructured membrane.

In some embodiments, the carbon-containing material comprises CO and/or $CO_2$. In some embodiments, the electrolyte solution comprises aqueous species resulting from the interaction of the carbon containing materials with water, including bicarbonate, carbonate ions, and/or formate. In some embodiments, the $CO_2$ is from air. In some embodiments, the CO and/or $CO_2$ is from an effluent gas.

In some embodiments, the C1+ product comprises at least 50% compounds in a molecular weight range from about C1 to about C4.

In some embodiments, the membrane comprises one or more materials selected from the group consisting of carbon nanotubes, carbon nanospheres, carbon nano-onions, graphene, and a porous pyrolyzed carbon.

In some embodiments, the catalyst comprises metal nanoparticles. In some embodiments, the catalyst comprises one or more materials that are N-doped. In some embodiments, the catalyst is comprised of and/or associated with a mircro- or nanostructured membrane.

In some embodiments, the method further comprises separating CO or $CO_2$ from a gas stream using a membrane separator. In some embodiments, the membrane separator comprises a micro- or nanostructured membrane. In some embodiments, the membrane separator comprises carbon nanotubes, carbon nanospheres, carbon nano-onions, or a porous pyrolyzed carbon.

In some embodiments, the recovering the C1+ product comprises separating the C1+ product using the membrane.

In some embodiments, the using of the cathode occurs at a temperature of about 10° C. to 40° C.

In some embodiments, the cathode and the anode are in electrical communication with a renewable power source. In some embodiments, the renewable power source is selected from the group consisting of a photovoltaic unit, wind turbine, geothermal unit, hydroelectric unit, tidal power, nuclear power, and a combination thereof.

In some embodiments, the introduction of carbon containing materials to the system is facilitated by use of hydroxides generated in the system.

Another aspect of the present disclosure provides an electrochemical reduction system, comprising a housing comprising (i) a cathode, and (ii) an anode, wherein the comprise or are associated with catalysts, and wherein the housing is configured to contain an electrolyte comprising a carbon-containing material in contact with the cathode, and a voltage source configured to be in electrical communication with the cathode and the anode, wherein the electrochemical reduction system is configured to reduce the carbon-containing material to a reduced carbon products comprising one or more carbon atoms (C1+ product), wherein the reduced carbon products are removed from the electrochemical reduction system with the aid of a micro- or nanostructured membrane.

In some embodiments, the system further comprises a gas contactor configured to introduce the carbon-containing material to water. In some embodiments, the gas contactor comprises a membrane. In some embodiments, the membrane comprises one or more nanomaterials selected from the group consisting of carbon nanotubes, carbon nanospheres, carbon nano-onions, and a porous pyrolyzed carbon.

In some embodiments, the membrane comprises one or more materials selected from the group consisting of carbon nanotubes, carbon nanospheres, carbon nano-onions, and a porous pyrolyzed carbon. In some embodiments, the one or more materials further comprises a catalyst. In some embodiments, the catalyst comprises metal nanoparticles. In some embodiments, the metal nanoparticles comprise a metal selected from the group consisting of copper, nickel, platinum, iridium, ruthenium, palladium, tin, silver, and gold. In some embodiments, the one or more catalyst materials is N-doped.

In some embodiments, the voltage source comprises a renewable power source. In some embodiments, the renewable power source is selected from the group consisting of photovoltaic, wind, geothermal, hydroelectric, tidal power, nuclear power, and a combination thereof In some embodiments, the introduction of carbon containing materials to the system is facilitated by use of hydroxides generated in the electrochemical process.

In some embodiments, the cathode is configured to operate at a temperature of about 10° C. to 40° C.

In some embodiments, the electrochemical reduction system comprises no distillation unit for the separation of reduced carbon products.

Another aspect of the disclosure provides an electrochemical reduction system, comprising a housing comprising (i) a cathode, wherein the cathode comprises a membrane comprising pores and a catalyst, and (ii) an anode, wherein the housing is configured to contain an electrolyte comprising a carbon-containing material in contact with the cathode, which electrolyte brings the cathode in electrical communication with the anode, and a voltage source configured to be in electrical communication with the cathode and the anode, wherein the electrochemical reduction system is configured to reduce the carbon-containing material to a reduced carbon product comprising one or more carbon atoms (C1+ product).

In some embodiments, the carbon-containing materials are introduced to the catalyst through the micro- or nanostructured membrane. In some embodiments, the reduced carbon products are removed through the micro- or nanostructured membrane as they are produced at its surface. In some embodiments, the membrane comprises one or more nanomaterials selected from the group consisting of carbon nanotubes, carbon nanospheres, carbon nano-onions, graphene, and porous pyrolyzed carbon.

In some embodiments, the catalyst comprises metal nanoparticles. In some embodiments, the metal nanoparticles comprise a metal selected from the group consisting of copper, platinum, iridium, ruthenium, palladium, tin, silver and gold.

In some embodiments, the cathode comprises a membrane having pores with sizes of less than or equal to about 5 micrometers In some embodiments, the material is N-doped.

In some embodiments, the voltage source comprises a renewable power source. In some embodiments, the renewable power source is selected from the group consisting of a photovoltaic unit, wind turbine, geothermal unit, hydroelectric unit, tidal power unit, nuclear power unit, and a combination thereof.

In some embodiments, the introduction of carbon containing materials to the system is facilitated by use of hydroxides generated by the reduction of the carbon-containing materials.

In some embodiments, the cathode operates at a temperature of about 10° C. to 40° C.

In some embodiments, the electrochemical reduction system comprises no distillation unit for the separation of reduced carbon products.

Another aspect of the disclosure provide a method for using a carbon-containing material to generate a reduced carbon product comprising one or more carbon atoms (C1+ product), comprising (a) directing an electrolyte solution comprising the carbon-containing material into an electrochemical system comprising a housing comprising (i) a cathode, wherein the cathode comprises a membrane comprising pores and a catalyst, and (ii) an anode, wherein the housing contains an electrolyte comprising the carbon-containing material in contact with the cathode, which electrolyte brings the cathode in electrical communication with the anode (b) at the cathode, reducing carbon containing materials to the C1+ product in the electrolyte solution with aid of the catalyst, and (c) recovering the C1+ product from the electrochemical reduction system, wherein the C1+ product is removed through a micro- or nanostructured membrane In some embodiments, the carbon-containing material comprises CO and/or $CO_2$. In some embodiments, the aqueous solution comprises species resulting from the interaction of CO or $CO_2$ with water, such as bicarbonate, carbonate, or formate ions.

In some embodiments, the $CO_2$ is from air. In some instances, the CO and/or $CO_2$ is from an effluent gas.

Pr In some embodiments, the C1+ product comprises at least 50% compounds in a molecular weight range from about C1 to about C4.

In some embodiments, the membrane comprises one or more materials selected from the group consisting of carbon nanotubes, carbon nanospheres, carbon nano-onions, graphene, and porous pyrolyzed carbon. In some instances, the one or more materials are N-doped.

In some embodiments, the carbon-containing materials are introduced to the catalyst through the micro- or nanostructured membrane.

In some embodiments, the reduced carbon products are removed through the micro- or nanostructured membrane as they are produced at its surface. In some embodiments, the membrane comprises carbon nanotubes, carbon nanospheres, carbon nano-onions, graphene, or porous pyrolyzed carbon.

In some embodiments, the recovering I C1+ product comprises separatIthe C1+ proIing the membrane.

In some embodiments, Ie using of the cathode occurs at a temperature of about 10° C. to 40° C.

In some embodiments, I the cathode and the anode are in electrical communication with a renewable power source. In some embodiments, the renewable power source is selected from the group consisting of a photovoltaic unit, wind turbine, geothermal unit, hydroelectric unit, tidal power unit, nuclear power unit, and a combination thereof.

In some embodiments, the introduction of carbon containing materials to the system is facilitated by use of hydroxides generated in the system.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1A:
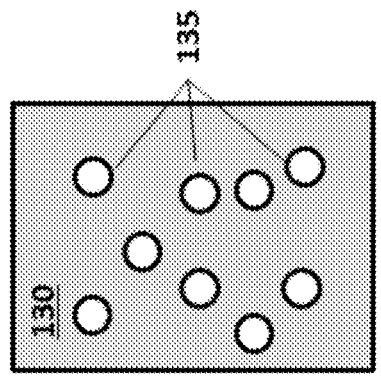
FIG. 1A depicts a cross-sectional and face-oriented schematic view of a micro- or nanostructured membrane material comprising nanotubes. Arrows depict pore space that may permit the selective passage of particular chemical species.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The terms "C1+" and "C1+ compound," as used herein, generally refer to a compound comprising one or more carbon atoms, e.g., one carbon atom (C1), two carbon atoms (C2), etc. C1+ compounds include, without limitation, alkanes (e.g., methane, $CH_4$), alkenes (e.g., ethylene, $C_2H_2$), alkynes and aromatics containing two or more carbon atoms. In some cases, C1'+ compounds include aldehydes, ketones, esters and carboxylic acids. Examples of C1+ compounds include, without limitation, methane, ethane, ethylene, acetylene, propane, propene, butane, butylene, etc.

The term "unit," as used herein, generally refers to a unit operation, which is a basic operation in a process. Unit operations may involve a physical change or chemical transformation, such as, for example, separation, crystallization, evaporation, filtration, polymerization, isomerization, transformation, and other reactions. A given process may require one or a plurality of unit operations to obtain the desired product(s) from a starting material(s), or feedstock(s).

The term "carbon-containing material," as used herein, generally refers to any material comprising at least one carbon atom. In some example, a carbon-containing material is carbon monoxide (CO), carbon dioxide ($CO_2$), or a mixture of CO and $CO_2$. The carbon-containing material may be a material derived from CO and/or $CO_2$, such as bicarbonate or bicarbonate ions.

Provided herein are systems and methods for producing various chemical products, including hydrocarbon fuels, from a source comprising a carbon-containing material, such as carbon monoxide (CO) and/or carbon dioxide ($CO_2$). The source may be a gas source or a liquid source. In some instances, the gas source comprising CO or $CO_2$ may be air drawn directly from the atmosphere. In other instances, the gas source comprising CO or $CO_2$ may be an effluent gas such as flue gas from a combustion process. In the present invention, a gas stream comprising CO or $CO_2$ may be drawn into an electrochemical reduction system that converts CO or $CO_2$ into hydrocarbons. The described systems may include one or more additional chemical conversion processes that allow the conversion of the CO- or $CO_2$- derived hydrocarbons into other valuable chemical products.

Also provided herein are various configurations for an electrochemical reduction system that converts CO or $CO_2$ into hydrocarbons. In some instances, the electrochemical reduction system may operate at an ambient temperature. The electrochemical reduction system may comprise one or more membranes that comprise a micro- or nanostructured material such as carbon nanotubes (CNTs) or graphene. In some instances, the micro- or nanostructured membranes may be capable of selectively separating CO or $CO_2$ from a mixed gas stream. In other instances, the micro- or nanostructured membranes may be capable of selectively separating certain hydrocarbons from a liquid or gaseous medium. Also provided herein are micro- or nanostructured membranes that comprise catalysts for the conversion of CO or $CO_2$ into hydrocarbons. In some instances, the micro- or nanostructured membrane may be configured to comprise an anode or cathode in an electrochemical reduction system.

Provided herein are various products that may be produced by the systems and methods described herein. The electrochemical reduction systems may produce alkanes, alkenes, alcohols, or other organic molecules of varying chain lengths. The products of the described electrochemical reduction systems may be further processed into other fuel and chemical products, such as polymers. The selectivity of the micro- or nanostructured membranes utilized in the electrochemical reduction systems may allow chemical products to be produced with tailored molecular weight ranges and increased purity from processing byproducts (e.g. metals, salts and other undesired inputs or products).

Also provided herein are systems of varying scale for producing chemicals from a gas stream comprising CO or $CO_2$. In some instances, chemicals may be produced from a chemical plant that comprises one or more CO or $CO_2$ electrochemical reduction systems. In other instances, chemicals may be produced from CO or $CO_2$ as a subsystem of a larger facility, for example as a scrubber on a power-generation facility. In other instances, chemicals may be produced using small-scale or even micro-scale devices. In some instances, an electrochemical reduction system utilizing a gas source comprising CO or $CO_2$ may be coupled with a renewable electrical generation sources (e.g. photovoltaics) to create a fully sustainable method of chemical production. In some instances, the system and methods described herein may be net carbon negative (i.e. they sequester more carbon than they produce). In some instances, the systems described herein may decrease the energy input of a chemical production process by at least about 50%.

Chemical Products

Described herein are various chemical products and reaction mixtures generated via the electrochemical reduction of CO or $CO_2$ derived from a gas source. Chemical products may include any process streams that is exported from a chemical processing system or any process stream that undergoes no further reactive processes. A reaction mixture may include any process mixture, reagent, or compound within the confines of a chemical reactor, reactor system, or in a process stream between chemical reactors or reactor systems. The chemical products and reaction mixtures of the present invention may include organic molecules where one or more of the constituent carbon atoms are derived from CO or $CO_2$. In some instances a chemical product or reaction mixture may contain only carbon atoms derived from CO or $CO_2$. In other instances, a chemical product may contain carbon atoms derived from CO or $CO_2$ and carbon atoms derived from other sources (e.g. fossil fuels). In some instances, chemical products of the present invention may have a distinct carbon isotope signature that is consistent with the carbon isotope signature of CO or $CO_2$ derived from the atmosphere. In some instances, chemical products and reaction mixtures of the present invention may have a distinct carbon isotope signature that is consistent with the carbon isotope signature of CO or $CO_2$ derived from a non-atmospheric source such as the combustion of fossil fuels. The carbon isotope signature of a chemical product or reaction mixture may be measured by an isotopic ratio of $^{14}C:^{12}C$ or $^{13}C:^{12}C$. In some instances the isotopic signature of a chemical product or reaction mixture may be measured as a percent difference between the natural isotopic ratio of carbon and the measured isotopic ratio. A percent difference between the natural isotopic ratio of carbon and the measured isotopic ratio for $^{14}C$, $\Delta^{14}C$, may be calculated as:

$$\Delta^{14}C = \left[ \frac{\left[\frac{^{14}C}{^{12}C}\right]_{measured}}{\left[\frac{^{14}C}{^{12}C}\right]_{standard}} - 1 \right] \times 1000\%$$

A percent difference between the natural isotopic ratio of carbon and the measured isotopic ratio for $^{13}C$, $\Delta^{13}C$, may be calculated as:

$$\Delta^{13}C = \left[ \frac{\left[\frac{^{13}C}{^{12}C}\right]_{measured}}{\left[\frac{^{13}C}{^{12}C}\right]_{standard}} - 1 \right] \times 1000\%$$

A chemical product or reaction mixture may have a $\Delta^{14}C$ of about −100%, −10%, 0%, 5%, 10%, 20%, 30%, 40%, 45%, 50% or about 100%. A chemical product or reaction mixture may have a $\Delta^{13}C$ of about −40%, −35%, −30%, −28%, −26%, −24%, −22%, −20%, −15%, −10%, −8%, or about −5%.

A chemical product or reaction mixture of the present invention may include gaseous, liquid, or solid substances. Chemical products and reaction mixtures of the current invention may include one or more organic compounds. Chemical products and reaction mixtures may be miscible or immiscible in water. Chemical products and reaction mixtures may be polar or nonpolar. Chemical products and reaction mixtures may be acidic, basic, or neutral. Organic compounds may include alkanes, alkenes, alkynes, cycloalkanes, cycloalkenes, cycloalkynes, substituted alkanes, substituted alkenes, substituted alkynes, alcohols, esters, carboxylic acids, ethers, amines, amides, aromatics, heteroaromatics, sulfides, sulfones, sulfates, thiols, aldehydes, ketones, amides, and halogenated compounds. Chemical products and reaction mixtures may include branched or linear compounds. Chemical products and reaction mixtures may comprise oxygen, methane, ethane, ethylene, propane, butane, hexanes, octanes, decanes, carbon monoxide, methanol, ethanol, propanol, butanol, hexanol, octanol, and formate. Chemical products and reaction mixtures may include organometallic compounds. Chemical products and reaction mixtures of the present disclosure may include compounds intended for consumer use or industrial use, such as fuels, solvents, additives, polymers, food additives, food supplements, pharmaceuticals, fertilizers, agricultural chemicals, coatings, lubricants, and building materials. Chemical products and reaction mixtures of the present disclosure may comprise a precursor, component, substituent, or substrate for a product produced by further processing.

An organic compound of the present disclosure may comprise one or more carbon atoms. In some instances, an organic compound may comprise about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, or about 70 carbon atoms. In some instances, an organic compound may comprise at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, or about 70 or more carbon atoms. In some instances, an organic compound may comprise no more than about 70, 65, 60, 55, 50, 45, 40, 35, 30, 29, 28, 27, 26, 25, 24, 23, 22, 21, 20, 19, 18, 17, 16, 15, 14, 13, 12, 11, 10, 9, 8, 7, 6, 5, 4, 3, 2 or less carbon atoms. An organic compound of the present disclosure may comprise one or more carbon atoms derived from CO or $CO_2$. In some instances, an organic compound may comprise about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, or about 70 carbon atoms that are derived from CO or $CO_2$. In some instances, an organic compound may comprise at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, or about 70 or more carbon atoms that are derived from CO or $CO_2$. In some instances, an organic compound may comprise no more than about 70, 65, 60, 55, 50, 45, 40, 35, 30, 29, 28, 27, 26, 25, 24, 23, 22, 21, 20, 19, 18, 17, 16, 15, 14, 13, 12, 11, 10, 9, 8, 7, 6, 5, 4, 3, 2 or less carbon atoms that are derived from CO or $CO_2$.

A chemical product or reaction mixture of the present disclosure may comprise more than one chemical species. A chemical product or reaction mixture may be a mixture of about 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95 or about 100 detectable chemical compounds. A chemical product or reaction mixture may be a mixture of at least about 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95 or about 100 or more detectable chemical compounds. A chemical product or reaction mixture may be a mixture of no more than about 100, 95, 90, 85, 80, 75, 70, 65, 60, 55, 50, 45, 40, 35, 30, 29, 28, 27, 26, 25, 24, 23, 22, 21, 20, 19, 18, 17, 16, 15, 14, 13, 12, 11, 10, 9, 8, 7, 6, 5, 4, or no more than about 3 or less detectable chemical compounds.

A chemical product or reaction mixture of the present disclosure may comprise a particular compound at a particular weight percentage or molar percentage of the total chemical product or reaction mixture. For example, a particular chemical product may include at least about 50 wt % ethanol. In another example, a particular chemical product may include no more than about 1 wt % water. In some instances, at least about 10%, 15%, 20%, 25%, 30%, 35%, 40%, 45%, 50%, 55%, 60%, 65%, 70%, 75%, 80%, 85%, 90%, 95%, 96%, 97%, 98%, 99% or more of a chemical product or reaction mixture may be a specific chemical compound on a weight or molar basis. In some instances, no more than about 99%, 98%, 97%, 96%, 95%, 90%, 85%, 80%, 75%, 70%, 65%, 60%, 55%, 50%, 45%, 40%, 35%, 30%, 25%, 20%, 15%, or no more than about 10% or less of a chemical product or reaction mixture be a specific chemical compound on a weight or molar basis.

A chemical product or reaction mixture of the present disclosure may include compounds within a particular range of molecular weights or carbon numbers. In some instances, at least about 10%, 15%, 20%, 25%, 30%, 35%, 40%, 45%, 50%, 55%, 60%, 65%, 70%, 75%, 80%, 85%, 90%, 95%, 96%, 97%, 98%, 99% or more of a chemical product or reaction mixture may include compounds within a particular molecular weight range or carbon number range. In some instances, no more than about 99%, 98%, 97%, 96%, 95%, 90%, 85%, 80%, 75%, 70%, 65%, 60%, 55%, 50%, 45%, 40%, 35%, 30%, 25%, 20%, 15%, or no more than about 10% or less of a chemical product or reaction mixture may include compounds within a particular molecular weight range or carbon number range. A chemical product or reaction mixture may include compounds within a molecular weight range from about 15 g/mol to about 30 g/mol, about 15 g/mol to about 60 g/mol, about 15 g/mol to about 100 g/mol, about 15 g/mol to about 200 g/mol, about 15 g/mol to about 400 g/mol, about 15 g/mol to about 600 g/mol, about 15 g/mol to about 1000 g/mol, about 30 g/mol to about 60 g/mol, about 30 g/mol to about 100 g/mol, about 30 g/mol to about 200 g/mol, about 30 g/mol to about 400 g/mol, about 30 g/mol to about 600 g/mol, about 30 g/mol to about 1000 g/mol, about 60 g/mol to about 100 g/mol, about 60 g/mol to about 200 g/mol, about 60 g/mol to about 400 g/mol, about 60 g/mol to about 600 g/mol, about 60 g/mol to about 1000 g/mol, about 100 g/mol to about 200 g/mol, about 100 g/mol to about 400 g/mol, about 100 g/mol to about 600 g/mol, about 100 g/mol to about 1000 g/mol, about 200 g/mol to about 400 g/mol, about 200 g/mol to about 600 g/mol, about 200 g/mol to about 1000 g/mol, about 400 g/mol to about 600 g/mol, about 30 g/mol to about 1000 g/mol, about 30 g/mol to about 100 g/mol, about 30 g/mol to about 200 g/mol, about 30 g/mol to about 400 g/mol, about 30 g/mol to about 600 g/mol, about 400 g/mol to about 1000 g/mol, or about 600 g/mol to about 1000 g/mol. A chemical product or reaction mixture may include compounds within a carbon number range from about C1 to about C2, about C1 to about C3, about C1 to about C4, about C1 to about C5, about C1 to about C6, about C1 to about C8, about C1 to about C10, about C1 to about C20, about C1 to about C30, about C1 to about C40, about C2 to about C3, about C2 to about C4, about C2 to about C5, about C2 to about C6, about C2 to about C8, about C2 to about C10, about C2 to about C20, about C2 to about C30, about C2 to about C40, about C3 to about C4, about C3 to about C5, about C3 to about C6, about C3 to about C8, about C3 to about C10, about C3 to about C20, about C3 to about C30, about C3 to about C40, about C4 to about C5, about C4 to about C6, about C4 to about C8, about C4 to about C10, about C4 to about C20, about C4 to about C30, about C4 to about C40, about C5 to about C6, about C5 to about C8, about C5 to about C10, about C5 to about C20, about C5 to about C30, about C5 to about C40, about C6 to about C8, about C6 to about C10, about C6 to about C20, about C6 to about C30, about C6 to about C40, about C8 to about C10, about C8 to about C20, about C8 to about C30, about C8 to about C40, about C10 to about C20, about C10 to about C30, about C10 to about C40, about C20 to about C30, about C20 to about C40, or about C30 to about C40.

A chemical product or reaction mixture of the present disclosure may comprise one or more impurities. Impurities may derive from reactant streams, reactor contaminants, breakdown or decomposition products of produced organic compounds, catalyst compounds, or side reactions in the electrochemical reduction system or other chemical conversion systems described herein. A chemical product or reaction mixture may comprise one or more organic impurities such as formate or higher molecular weight alcohols. A chemical product or reaction mixture may include carbon or non-carbon nanomaterial impurities. A chemical product or reaction mixture may comprise one or more inorganic impurities derived from sources such as catalyst degradation or leaching and corrosion of processing equipment. An inorganic impurity may comprise sodium, magnesium, potassium, calcium, titanium, vanadium, chromium, manganese, iron, cobalt, nickel, copper, zinc, aluminum, silicon, yttrium, zirconium, niobium, molybdenum, ruthenium, rhodium, palladium, silver, cadmium, indium, tin, antimony, tantalum, tungsten, osmium, platinum, gold, mercury, and lead. Inorganic impurities may be present in oxidized or reduced oxidation states. Inorganic impurities may be present in the form of organometallic complexes. An impurity in a chemical product or reaction mixture may be detectable by any common analysis technique such as gas or liquid chromatography, mass spectrometry, IR or UV-Vis spectroscopy, Raman spectroscopy, X-ray photoelectron spectroscopy, X-ray diffraction, or other methods. One or more impurities may be detectable at an amount of at least about 1 part per billion (ppb), 5 ppb, 10 ppb, 50 ppb, 100 ppb, 250 ppb, 500 ppb, 750 ppb, 1 part per million (ppm), 5 ppm, 10 ppm, 50 ppm, 100 ppm or more. One or more impurities may be detectable at an amount of no more than about 100 ppm, 50 ppm, 10 ppm, 5 ppm, 1 ppm, 750 ppb, 500 ppb, 250 ppb, 100 ppb, 50 ppb, 10 ppb, 5 ppb, or no more than about 1 ppb or less.

A chemical product may have a particular level of purity. In some instances, a chemical product may have sufficient purity to achieve a particular grade or standard. A chemical product may be ACS grade, reagent grade, USP grade, NF grade, laboratory grade, purified grade or technical grade. A chemical product may have a purity that exceeds an azeotropic composition, e.g. >95% ethanol. A gaseous chemical product of the current invention may have a purity rating of about N1.0, N2.0, N3.0, N4.0, N5.0, N6.0 or greater. A chemical product may achieve a purity level according to a defined international standard. E.g. the ASTM D-1152/97 standard for methanol purity.

In some instances a chemical product or reaction mixture from an electrochemical reduction system may have no detectable amount of certain impurities. In some instances, a chemical product or reaction mixture may have no detectable amount of biological molecules or derivatives thereof. A chemical product or reaction mixture may contain no detectable amount of lipids, saccharides, proteins, nucleic acids, amino acids, spores, bacteria, viruses, protozoa, fungi, animal or plant cells, or any component thereof.

Chemical Feeds

The electrochemical conversion systems and related systems may require one or more feed streams. Feed streams may comprise solids, liquids or gases. Feed streams may comprise slurries, pastes, powders, particles, or bed materials. In some instances, a feed stream may comprise one or more chemical reactants. In other instances, a feed stream may comprise a catalyst, a co-catalyst, an activator, an inhibitor, a buffer, or a reactive scavenger. In some instances, a feed stream may comprise an inert species.

A feed stream may comprise a gas or a mixture of gases. In some instances, a gas stream may comprise CO, $CO_2$, nitrogen, a nitrogen oxide, oxygen, ozone, argon, hydrogen, helium, methane, ethane, ethylene, propane, propylene, hydrogen sulfide, a sulfur oxide, silanes, aromatics, chlorine, hydrochloric acid, sulfuric acid, nitric acid, water vapor, and other gases. In some instances, a gas stream may comprise air drawn directly from the atmosphere. In other instances, a gas stream may comprise effluent gases from an industrial or other source. In some instances, a gas stream may comprise suspended particulates such as soot, pollen, spores, dust, and mineral matter or ash. A gas stream may comprise an aerosol. A gas stream may be filtered or scrubbed to remove particulates or unwanted chemical species. A gas stream may be subjected to one or more operations before entering a chemical conversion process or other process to alter its composition or otherwise prepare the gas stream for utilization. A gas stream may be separated or purified to enrich for a particular component (e.g. $CO_2$) or remove an unwanted component (e.g. hydrogen sulfide).

A feed stream may comprise a liquid or a mixture of liquids. In some instances, a liquid stream may comprise a chemical reactant. In other instances, a liquid stream may comprise a solvent carrying a chemical reactant. A liquid stream may comprise a buffered solution, e.g. bicarbonate solution. A liquid stream may comprise one or more of alkanes, alkenes, alkynes, cycloalkanes, cycloalkenes, cycloalkynes, substituted alkanes, substituted alkenes, substituted alkynes, alcohols, esters, carboxylic acids, ethers, amines, amides, aromatics, heteroaromatics, sulfides, sulfones, sulfates, thiols, aldehydes, ketones, amides, and halogenated compounds.

A liquid feed stream may comprise an aqueous solution. An aqueous solution may be buffered to maintain a particular pH. A feed stream may have a pH of about 0, 1, 2, 3, 4, 5, 6, 7, 8, 9, 10, 11, 12, 13, or about 14. A feed stream may have a pH of at least about 0, 1, 2, 3, 4, 5, 6, 7, 8, 9, 10, 11, 12, 13, 14 or more. A feed stream may have a pH of no more than about 14, 13, 12, 11, 10, 9, 8, 7, 6, 5, 4, 3, 2, 1, 0 or less.

A feed stream may be a multi-phase stream. A feed stream may comprise gas entrained in a liquid or a solid entrained in a liquid, such as a slurry. A feed stream may exist in a phase equilibrium between solid and liquid, liquid and gas, or solid and gas.

A feed stream may comprise one or more impurities or tracer compounds. Impurities in a feed stream may arise from the processes that produced them or transportation methods used to convey the feed stream matter from production to the systems of the present disclosure. Impurities may include organic or inorganic chemical species, particulates (e.g. dirt, dust, rust, or ash), and biological materials. An impurity may be detrimental to the performance of an electrochemical reduction system or related system. An inorganic impurity may comprise sodium, magnesium, potassium, calcium, titanium, vanadium, chromium, manganese, iron, cobalt, nickel, copper, zinc, aluminum, silicon, yttrium, zirconium, niobium, molybdenum, ruthenium, rhodium, palladium, silver, cadmium, indium, tin, antimony, tantalum, tungsten, osmium, platinum, gold, mercury, and lead. Inorganic impurities may be present in oxidized or reduced oxidation states. Inorganic impurities may be present in the form of organometallic complexes. A feed stream may be purified before use to remove one or more impurities before utilization in an electrochemical reduction system or a related system. A tracer compound may comprise a chemical species that exists at a low but detectable level within a feed stream. A tracer compound may be come in a particular feed stream reagent or may be added to a feed stream prior to the feed stream entering a conversion or other process. A tracer compound may be an inert species. A tracer compound may be a compound that is selectively converted, separated, or otherwise altered in certain processes and is unaffected by other processes. An impurity or a tracer compound may have a measured concentration in a feed stream. An impurity or a tracer compound in a chemical product may be detectable by any common analysis technique such as gas or liquid chromatography, mass spectrometry, IR or UV-Vis spectroscopy, Raman spectroscopy, X-ray photoelectron spectroscopy, X-ray diffraction, or other methods. One or more impurities or tracer compounds may be detectable at an amount of at least about 1 ppb, 5 ppb, 10 ppb, 50 ppb, 100 ppb, 250 ppb, 500 ppb, 750 ppb, 1 ppm, 5 ppm, 10 ppm, 50 ppm, 100 ppm or more. One or more impurities or tracer compounds may be detectable at an amount of no more than about 100 ppm, 50 ppm, 10 ppm, 5 ppm, 1 ppm, 750 ppb, 500 ppb, 250 ppb, 100 ppb, 50 ppb, 10 ppb, 5 ppb, or no more than about 1 ppb or less.

Structured Membranes

The present disclosure may provide reactor and separation systems that comprise micro- or nanostructured membranes. A micro- or nanostructured membrane may be utilized to perform a selective separation of one or more chemical species from a mixture comprising more than one chemical species. A micro- or nanostructured membrane may also provide additional utility in a chemical processing system including physically separating product streams and comprising a component of an electrical cathode or anode in an electrochemical system.

Figure 2:
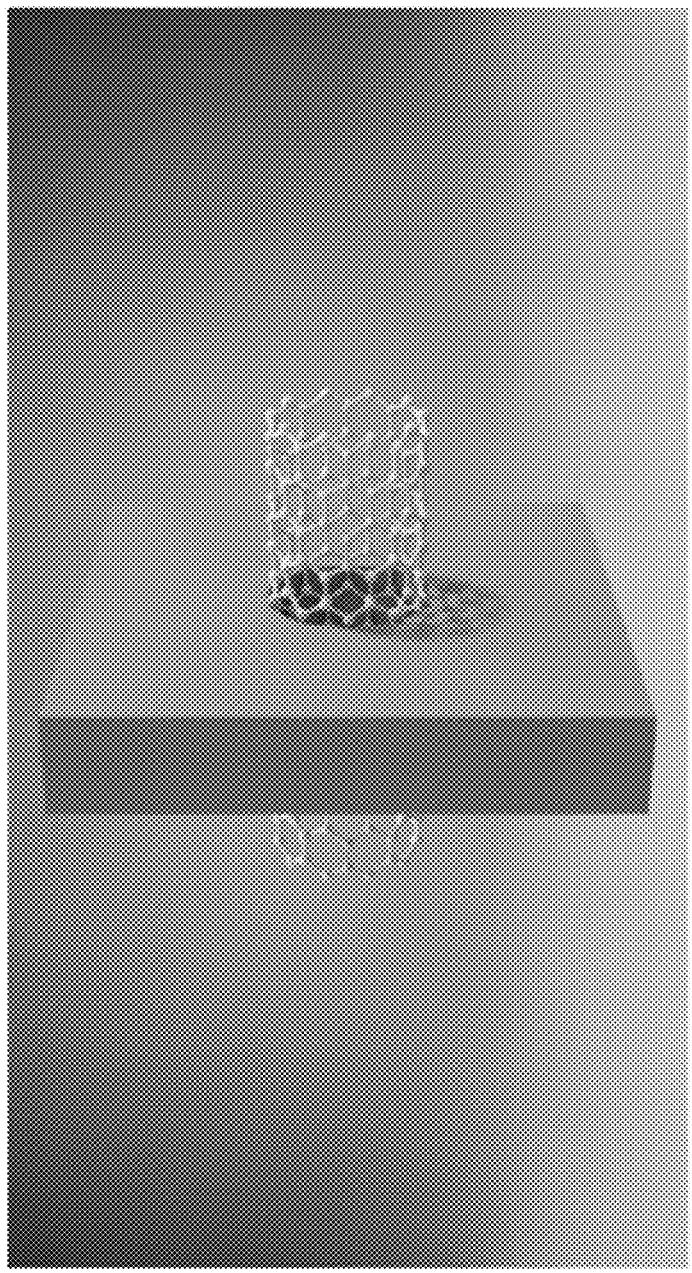
FIG. 2 depicts an illustration of a carbon nanotube embedded in a membrane material.
Figure 4:
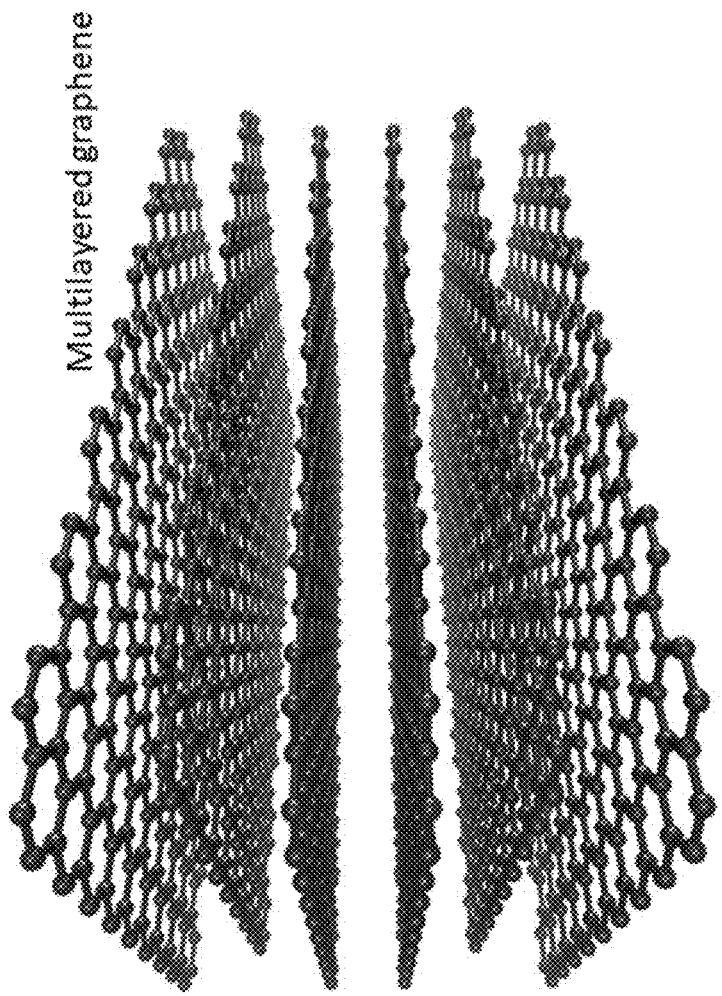
FIG. 4 illustrates a representative graphene-like material of the present invention.

A micro- or nanostructured membrane may comprise one or more microscale or nanoscale materials features (e.g., including positive features, such as microscale or nanoscale structures, and/or negative features, such as microscale and nanoscale pores or microscale and nanoscale depressions). In some instances, a membrane may comprise carbon nanotubes, carbon nanospheres, carbon nano-onions, graphene-like materials, or pyrolyzed porous carbon materials (see FIGS. 2 and 4). A membrane may comprise micro- or nanostructured material synthesized from non-carbon materials. A membrane may comprise carbon nanomaterials doped with other elements such as nitrogen, sulfur, and boron. A micro- or nanostructured material may be embedded, fixed, or otherwise bound to one or more other substrates or materials to construct a membrane. A micro- or nanostructured material embedded in a substrate or material may create pores within the structured membrane. The pores may permit the selective passage of certain chemical species. Other substrates or materials in the membrane may be selected for material properties including rigidity, strength, and electrical conductivity. Other substrates or materials in a micro- or nanostructured membrane may include polymers, e.g. polysulfones, metals, and ceramics. The microscale or nanoscale features may have a maximum dimension of at least about 0.4 nanometers (nm), 0.6 nm, 0.8 nm, 1 nm, 1.2 nm, 1.4 nm, 1.6 nm, 1.8 nm, 2.0 nm, 2.5 nm, 3.0 nm, 3.5 nm, 4.0 nm, 4.5 nm, 5.0 nm, 5.5 nm, 6.0 nm, 6.5 nm, 7.0 nm, 7.5 nm, 8.0 nm, 8.5 nm, 9.0 nm. 9.5 nm. 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 micrometer, 10 micrometers, 100 micrometers or larger. In some instances, the maximum dimension may be at most about 100 micrometers, 10 micrometers, 1 micrometer, 900 nm, 800 nm, 700 nm. 600 nm, 500 nm, 400 nm, 300 nm, 200 nm, 100 nm, 90 nm, 80 nm, 70 nm, 60 nm, 50 nm, 40 nm, 30 nm, 20 nm, 10 nm, 9.5 nm, 9.0 nm, 8.5 nm, 8 nm, 7.5 nm, 7.0 nm, 6.5 nm, 6.0 nm, 5.5 nm, 5.0 nm, 4.5 nm, 4.0 nm, 3.5 nm, 3.0 nm, 2.5 nm, 2.0 nm, 1.8 nm, 1.6 nm, 1.4 nm, 1.2 nm, 1.0 nm, 0.8 nm, 0.6 nm, or 0.4 nm or less.

Figure 3B:
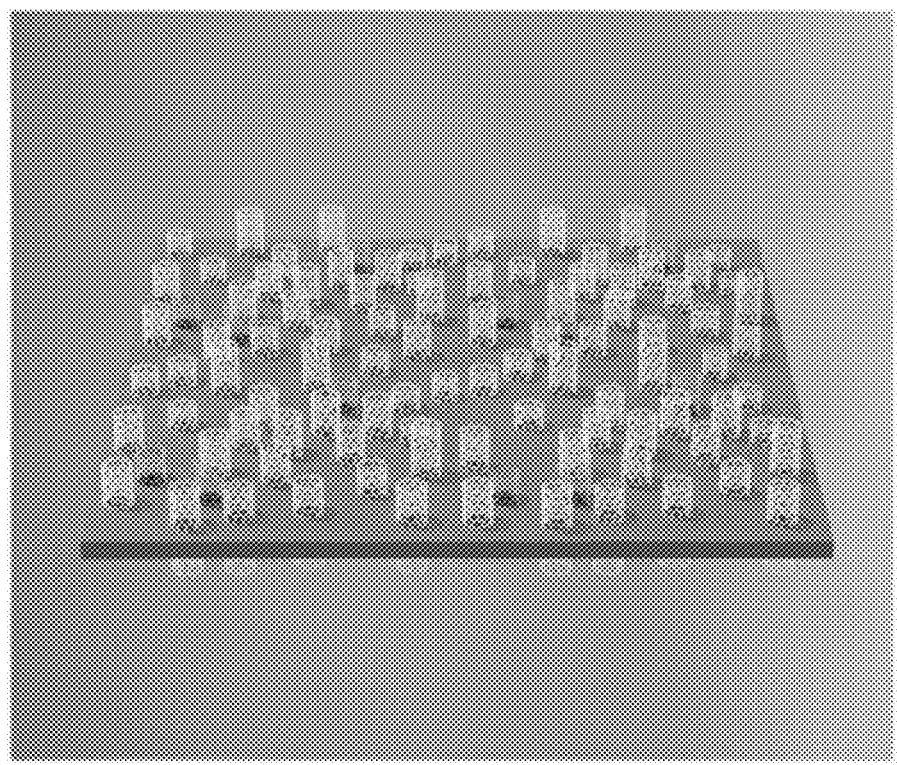
FIG. 3B shows a detailed illustration of a small region of the membrane surface that comprises carbon nanotubes.
Figure 3A:
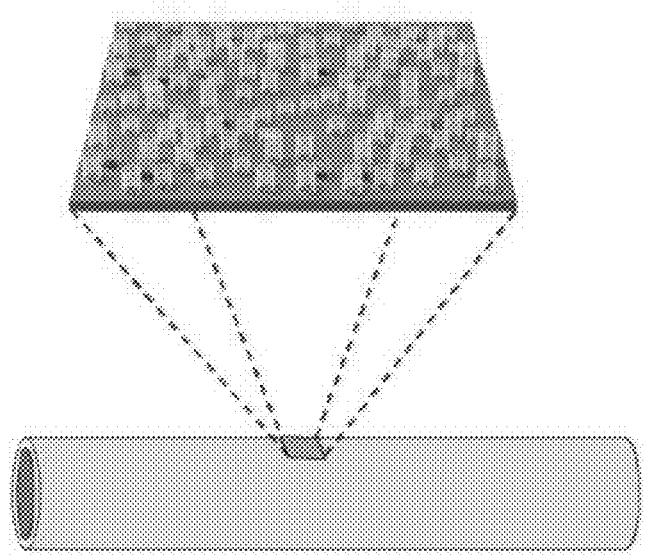
FIG. 3A depicts a micro- or nanostructured membrane configured in a cylindrical fashion (such as a hollow fiber).

A micro- or nanostructured membrane may comprise a particular shape, structure depending upon its application. In some instances, a membrane may have a cylindrical structure (see FIGS. 3A and 3B) such as with a hollow fiber membrane format, or have a substantially flat sheet structure. A membrane may partially or fully enclose a volume or void space. The surface area of a membrane disposed toward an enclosed or void space may be defined as a lumen side of the membrane. In some instances, mass transfer across a membrane may be driven by chemical potential, pressure difference, or temperature difference between a lumen side and a non-lumen side of a membrane. A membrane may further comprise additional structures such as frames or fittings that secure the membrane to other portions of the described systems.

Figure 1B:
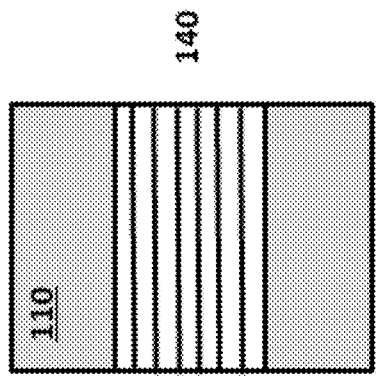
FIG. 1B depicts a cross-sectional and face-oriented schematic view of a micro- or nanostructured membrane material comprising nano-onions. Arrows depict pore space that may permit the selective passage of particular chemical species.
Figure 1C:
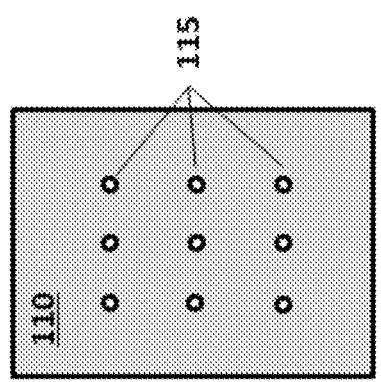
FIG. 1C depicts a cross-sectional and face-oriented schematic view of a micro- or nanostructured membrane material comprising a pyrolyzed porous material. Arrows depict pore space that may permit the selective passage of particular chemical species.
Figure 1D:
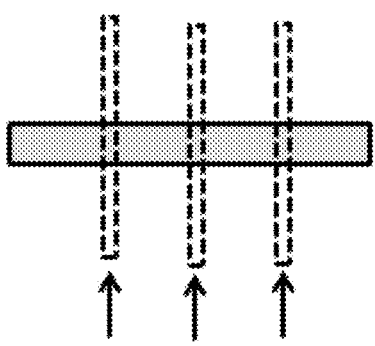
FIG. 1D depicts a cross-sectional and face-oriented schematic view of a micro- or nanostructured membrane material comprising a graphene-like material. Arrows depict pore space that may permit the selective passage of particular chemical species.

A micro- or nanostructured membrane may be composed with micro- or nanomaterials embedded so as to create pores within the membrane. The micro- or nanomaterial may be chosen based upon a characteristic pore size that it may create. Without wanting to be bound by theory, a pore may be defined as a void space or volume within a solid material through which a liquid or gas molecule may flow or diffuse. A chemical species may pass through a pore created by the internal diameter space in a carbon nanotube (see FIG. 1A), through spaces between nanoparticles e.g. clustered nanotubes or nano-onions (see FIG. 1B), through the pores of a porous carbon (see FIG. 1C), or through the space between layers of graphene-like material (see FIG. 1D). A micro- or nanomaterial may have a characteristic length scale such as a diameter, pore size, or layer spacing that is sufficient to permit the passage of chemical species through a void space in the material. In some instances, a characteristic length may be at least about 0.4 nanometers (nm), 0.6 nm, 0.8 nm, 1 nm, 1.2 nm, 1.4 nm, 1.6 nm, 1.8 nm, 2.0 nm, 2.5 nm, 3.0 nm, 4.0 nm, 5.0 nm or larger. In some instances, a characteristic length may be no more than about 5.0 nm, 4.0 nm, 3.0 nm, 2.5 nm, 2.0 nm, 1.8 nm, 1.6 nm, 1.4 nm, 1.2 nm, 1.0 nm, 0.8 nm, 0.6 nm, or about 0.4 nm or less. A pore may have a larger diameter than length. A pore may have a larger length than diameter. A pore may have a length to width ratio of about 1:10, 1:5, 1:2, 1:1, 2:1, 5:1, 10:1, 100:1, or about 1000:1. A pore may have a length to width ratio of at least about 1:10, 1:5, 1:2, 1:1, 2:1, 5:1, 10:1, 100:1, or about 1000:1. A pore may have a length to width ratio of no more than about 1000:1, 100:1, 10:1, 5:1, 2:1, 1:1, 1:2, 1:5, or about 1:10 or less. A pore may comprise a substantially straight path such as a carbon nanotube or the space between layers of horizontal graphene-like materials. A pore may have a diagonal, skewed, or tortuous path in some materials, such as meso- or nanoporous carbons.

A membrane may comprise a material with a characterized porous structure. Materials may include nanopores, mesopores, and micropores. In some instances, nanopores may be characterized as having an average diameter of about 2 nm or less. In some instances, mesopores may be characterized as having an average diameter of between about 2 nm and about 20 nm. In some instances, micropores may be characterized as having an average diameter of about 20 nm or more. A membrane may comprise structures with pore sizes across a range of pores sizes (e.g., nanopores and mesopores). A membrane may comprise structures with pores sizes from within a particular classification of pores sizes (e.g., only mesopores). A membrane may comprise pores (e.g., micropores or nanopores) with an average diameter of at least about 0.5 nm, 1 nm, 5 nm, 10 nm, 15 nm, 20 nm, 30 nm, 40 nm, 50 nm, 100 nm, 250 nm, 500 nm, 1 micron (µm), or at least about 5 µm. A membrane may comprise pores with an average diameter of no more than about 5 µm, 1 µm, 500 nm, 250 nm, 100 nm, 50 nm, 40 nm, 30 nm, 20 nm, 15 nm, 10 nm, 5 nm, 1 nm, 0.5 nm or less.

A membrane comprising a micro- or nanostructured material may permit mass transport of one or more chemical species across the membrane. A membrane comprising a micro- or nanostructured material may be selective for particular species. In some instances, a membrane comprising micro- or nanostructured materials may selectively transfer CO or $CO_2$ from a gas stream. In some instances, a membrane comprising micro- or nanostructured materials may selectively transfer gaseous ethylene or ethanol from a gas mixture. In some instances, a membrane comprising micro- or nanostructured materials may selectively transfer hydrocarbons from an aqueous liquid mixture. A membrane comprising a micro- or nanostructured material may transfer particular chemical species by diffusive or convective mass transport. In some instances, mass transfer may be enhanced by the application of an external force or field. In particular instances, mass transfer may be driven or enhanced by the application of a magnetic or electrical field. In other instances, mass transfer may be driven by a pressure gradient (e.g. pulling a vacuum on one side of the membrane). In some instances, the selectivity of a membrane can be reversed by reversing an applied field or force. In other instances, a membrane may have a unidirectional or invariant mass transfer selectivity.

A micro- or nanostructured membrane may have an optimal or preferred operation temperature and operation pressure. In some instances, a system comprising a micro- or nanostructured membrane may be operated at an ambient pressure or temperature. In some instances, a system comprising a micro- or nanostructured membrane may be operated at an elevated pressure or under a vacuum or reduced pressure. A pressure gradient may be utilized to drive mass transfer across a membrane system. A micro- or nanostructured membrane may be utilized in a system with an operating temperature of about −30° C., −20° C., −10° C., 0° C., 5° C., 10° C., 15° C., 20° C., 25° C., 30° C., 35° C., 40° C., 50° C., 60° C., 70° C., or about 80° C. A micro- or nanostructured membrane may be utilized in a system with an operating temperature of at least about −30° C., −20° C., −10° C., 0° C., 5° C., 10° C., 15° C., 20° C., 25° C., 30° C., 35° C., 40° C., 50° C., 60° C., 70° C., or about 80° C. or more. A micro- or nanostructured membrane may be utilized in a system with an operating temperature of no more than about 80° C., 75° C., 70° C., 65° C., 60° C., 55° C., 50° C., 45° C., 40° C., 35° C., 30° C., 25° C., 20° C., 15° C., 10° C., 5° C., 0° C., −5° C., −10° C., −20° C., or about −30° C. or less.

A micro- or nanostructured membrane may be utilized in a system with an operating pressure of about 0 bar, 1 bar, 2 bar, 3 bar, 4, bar, 5 bar, 6 bar, 7 bar, 8 bar, 9 bar, 10 bar, 15 bar, 20 bar, 30 bar, 40 bar, 50 bar or more. A micro- or nanostructured membrane may be utilized in a system with an operating pressure of at least about 1 bar, 2 bar, 3 bar, 4, bar, 5 bar, 6 bar, 7 bar, 8 bar, 9 bar, 10 bar, 15 bar, 20 bar, 30 bar, 40 bar, 50 bar or more. A micro- or nanostructured membrane may be utilized in a system with an operating pressure of no more than about 50 bar, 40 bar, 30 bar, 20 bar, 15 bar, 10 bar, 9 bar, 8 bar, 7 bar, 6 bar, 5 bar, 4 bar, 3 bar, 2 bar, 1 bar or less.

A micro- or nanostructured membrane may be capable of permitting a particular flux of CO or $CO_2$ across the membrane. A flux of CO or $CO_2$ may be driven by a pressure gradient across the membrane. In some instances, a pressure gradient may be driven by a gas stream comprising CO or $CO_2$ at a pressure elevated above ambient pressure. In other instances, a pressure gradient may exist by pulling a vacuum on one side of the membrane, e.g. the lumen side. A micro- or nanostructured membrane may permit a CO or $CO_2$ flux of about 0.1 kilogram gas/m$^2$ of membrane/hr (kg/m$^2$/hr), 0.5 kg/m²/hr, 1 kg/m²/hr, 2 kg/m²/hr, 3 kg/m²/hr, 4 kg/m²/hr, 5 kg/m²/hr, 6 kg/m²/hr, 7 kg/m²/hr, 8 kg/m²/hr, 9 kg/m²/hr, or about 10 kg/m²/hr. A micro- or nanostructured membrane may permit a CO or $CO_2$ flux of at least about 0.1 kg/m²/hr, 0.5 kg/m²/hr, 1 kg/m²/hr, 2 kg/m²/hr, 3 kg/m²/hr, 4 kg/m²/hr, 5 kg/m²/hr, 6 kg/m²/hr, 7 kg/m²/hr, 8 kg/m²/hr, 9 kg/m²/hr, or at least about 10 kg/m²/hr. A micro- or nanostructured membrane may permit a CO or $CO_2$ flux of no more than about 10 kg/m²/hr, 9 kg/m²/hr, 8 kg/m²/hr, 7 kg/m²/hr, 6 kg/m²/hr, 5 kg/m²/hr, 4 kg/m²/hr, 3 kg/m²/hr, 2 kg/m²/hr, 1 kg/m²/hr, 0.5 kg/m²/hr, or about 0.1 kg/m²/hr or less.

A micro- or nanostructured membrane may be capable of permitting a particular flux of hydrocarbons across the membrane. A flux of hydrocarbons may be driven by a pressure gradient across the membrane. In some instances, a pressure gradient may be driven by a gas or liquid stream comprising hydrocarbons at a pressure elevated above ambient pressure. In other instances, a pressure gradient may exist by pulling a vacuum on one side of the membrane, e.g. the lumen side. A micro- or nanostructured membrane may permit a hydrocarbon flux of about 0.1 kilogram hydrocarbon/m² of membrane/hr (kg/m²/hr), 0.5 kg/m²/hr, 1 kg/m²/hr, 2 kg/m²/hr, 3 kg/m²/hr, 4 kg/m²/hr, 5 kg/m²/hr, 6 kg/m²/hr, 7 kg/m²/hr, 8 kg/m²/hr, 9 kg/m²/hr, or about 10 kg/m²/hr. A micro- or nanostructured membrane may permit a hydrocarbon flux of at least about 0.1 kilogram kg/m²/hr, 0.5 kg/m²/hr, 1 kg/m²/hr, 2 kg/m²/hr, 3 kg/m²/hr, 4 kg/m²/hr, 5 kg/m²/hr, 6 kg/m²/hr, 7 kg/m²/hr, 8 kg/m²/hr, 9 kg/m²/hr, or at least about 10 kg/m²/hr. A micro- or nanostructured membrane may permit a hydrocarbon flux of no more than about 10 kg/m²/hr, 9 kg/m²/hr, 8 kg/m²/hr, 7 kg/m²/hr, 6 kg/m²/hr, 5 kg/m²/hr, 4 kg/m²/hr, 3 kg/m²/hr, 2 kg/m²/hr, 1 kg/m²/hr, 0.5 kg/m²/hr, or about 0.1 kg/m²/hr or less.

A membrane with an enhanced selectivity for one or more chemical species may enhance the chemical conversion rate or phase equilibrium of a conversion system. Without wanting to be bound to theory, selective enrichment for one or more chemical species within the void or pore space of the micro- or nanostructured component of a membrane may increase the volumetric concentration of the one or more chemical species within the void or pore space. In some instances, a kinetic rate enhancement or shift in phase equilibrium for a particular chemical reaction may be driven by one or more chemical species having higher volumetric concentrations within the membrane than may be predicted by their bulk phase concentrations on either side of the membrane. In a particular instance, the selective mass transfer of one or more chemical species through a membrane may cause an increased concentration of the one or more chemical species in a boundary layer adjacent to the surface of the membrane. An increase in the boundary layer concentration of the one or more chemical species may increase the availability of one or more chemical species to a catalyst deposited at the surface of the membrane. In another instance, a catalyst may be deposited within the void or pore space of a micro- or nanostructured material within a membrane, allowing direct transfer of an increased mass transfer of one or more chemical species to the catalyst by bulk flow.

The mass transfer selectivity of a membrane for one or more chemical species may cause a measurable enhancement of the rate of reaction for one or more chemical reactions in a chemical conversion system that comprises such a membrane. In some instances, the rate of reaction for one or more chemical reactions may increase by at least about 5%, 10%, 20%, 30%, 40%, 50%, 75%, 100%, 150%, 200%, 500%, or about 1000% or more. In some instances, the rate of reaction for one or more chemical reactions may be higher than may be predicted by the use of measured reactant concentrations due to other synergistic effects such as electric field enhancement of catalyst activity. In some instances, the mass transfer selectivity of a membrane for one or more chemical species may cause a measurable reduction in the rate of reaction for one or more chemical unwanted reactions (e.g. side reactions, degradation reactions) in a chemical conversion system that comprises such a membrane. In some instances, the rate of reaction for one or more unwanted chemical reactions may decrease by at least about 5%, 10%, 20%, 30%, 40%, 50%, 75%, 100%, 150%, 200%, 500%, or about 1000% or more.

Figure 5:
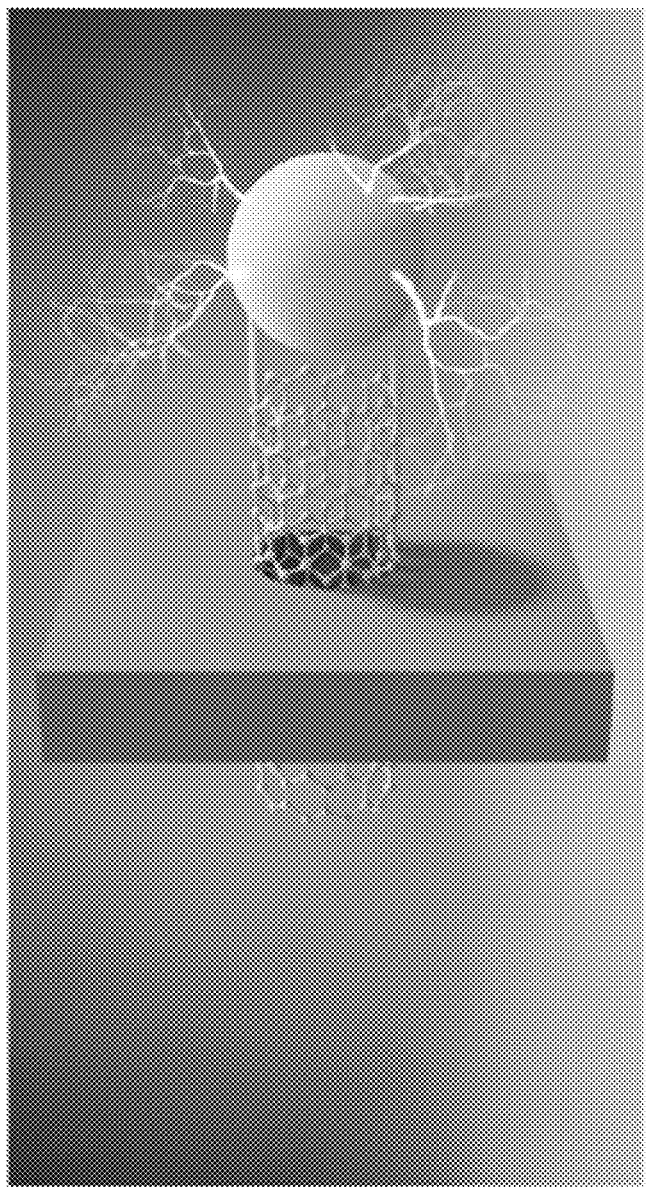
FIG. 5 shows an illustration of a catalyst nanoparticle associated with a carbon nanotube as provided in the present disclosure.

A membrane comprising a micro- or nanostructured material may further comprise one or more catalyst materials. A catalyst material may be attached, bonded, deposited or functionalized to the surface of a micro- or nanostructured material. In some instances, a catalyst may be located on a surface of a membrane. A catalyst may be localized in particular areas of a membrane or on particular areas of a micro- or nanostructured material to control where a catalyzed chemical reaction may occur. A catalyst may be located within a pore or pore-like structure in a membrane. A chemical reaction catalyzed by a catalyst may occur on a particular area of the membrane or within the pore or pore-like space of the membrane. A catalyst may comprise a metal atom, metal complex, or metal particle. A catalyst may comprise a metal such as titanium, vanadium, chromium, manganese, iron, cobalt, nickel, copper, zinc, aluminum, silicon, yttrium, zirconium, niobium, molybdenum, ruthenium, rhodium, palladium, silver, cadmium, indium, tin, antimony, tantalum, tungsten, osmium, platinum, gold, mercury, or lead. In some instances, a doped carbon nanomaterial may comprise a catalyst. In a particular instance, N-doped carbon nanotubes may comprise a catalyst. In another instance, carbon nanotubes with electrodeposited platinum, nickel, or copper nanoparticles may comprise a catalyst (see FIG. 5). A membrane may comprise more than one catalyst. In some instances, one or more catalysts may be deposited on one or more areas or surfaces of a membrane, and one or more differing catalysts may be deposited on one or more differing areas or surfaces of a membrane. A membrane may be capable of catalyzing one or more chemical reactions when mass transfer occurs in a particular direction across the membrane, and may be capable of catalyzing one or more differing chemical reactions when mass transfer occurs in a differing direction across the membrane.

An electrochemical reduction process utilizing a micro- or nanostructured catalyst membrane may utilize methods or components to minimize catalyst poisoning. A micro- or nanostructured membrane comprising a catalyst may be refreshed or regenerated to mitigate the impact of catalyst poisoning and the deposition of other unwanted species. In some instances, a membrane may be removed from an electrochemical reduction system for catalyst regeneration. In other instances, a membrane may be flushed with acid to dissolve or remove catalyst particles, followed thereafter by deposition of new catalyst particles on the membrane surface or nanoparticle surface.

A membrane comprising a micro- or nanostructured material may have enhanced electrical properties. In some aspects, the membranes may be conductive, due to the electrical properties of the micro- or nanostructured materials. In some instances, a membrane may be semiconducting (e.g. carbon nanotubes of a particular chirality). A membrane may be configured to act as an electrode in an electrochemical system. A membrane may allow an electrical current to be conveyed to one or more catalysts associated with it. An electrical current may enhance the reactivity of a catalyst for particular catalyzed chemical reactions. In some instances, the selective mass transfer of particular chemical species across a micro- or nanostructured membrane may increase the current density achieved at the membrane electrode.

A membrane comprising a micro- or nanostructured material may be utilized for various purposes. In some instances, a membrane may permit mass transfer of a chemical species from a first gas mixture into a second gas mixture. In some instances, a membrane may permit mass transfer of a chemical species from a gas phase into a liquid phase. In some instances, a membrane may permit mass transfer of a chemical species from a first liquid mixture into a second liquid mixture. In some instances, a membrane may permit mass transfer of a chemical species to a catalytic site where a chemical reaction may occur. In some instances, a membrane may be utilized to perform both chemical separations and catalysis. In some instances, a membrane may be cycled between separation and catalysis by the directional application of electric fields or other fields or forces. In other instances, a membrane may be capable of simultaneously catalyzing and performing a chemical separation.

Chemical Conversion Systems

The invention of the present disclosure includes chemical conversion systems for the conversion of carbon dioxide into other chemical species via electrochemical reduction. Numerous embodiments of the present invention may be conceived over a wide range of processing scales. CO or $CO_2$ conversion systems may include microscale fuel production devices, standalone chemical production systems that produce specific chemicals or fuels at the scale of tens to hundreds of kilograms per day, or industrial-scale production of chemicals or fuels at the scale of thousands of kilograms per day or more.

A chemical conversion system may utilize one or more micro- or nanostructured membranes to perform the electrochemical reduction of carbon dioxide. A chemical conversion system may include one or more micro- or nanostructured membranes to perform a separation of carbon dioxide from a gas stream and supply the carbon dioxide to a chemical reactor. A chemical conversion system may include one or more micro- or nanostructured membranes to perform a separation of a chemical mixture resulting from a unit operation of a chemical conversion system. A chemical conversion system may include one or more micro- or nanostructured membranes to perform a catalyzed electrochemical reduction of carbon dioxide to another chemical species (e.g. formate, methanol, ethanol). A chemical conversion system may include one or more micro- or nanostructured membranes to perform one or more catalyzed conversion reactions of one or more species formed via electrochemical reduction of carbon dioxide (e.g. further reduction of CO or $CO_2$ reduced products, such as formate to methanol or ethanol, methanol and ethanol to propanol, ethanol to butanol, etc; dehydration of ethanol to ethylene).

A chemical conversion system may comprise one or more unit operations for separating chemical species using a membrane comprising a micro- or nanostructured material. A chemical conversion system may comprise one or more unit operations for reacting one or more chemical species using a membrane comprising a micro- or nanostructured material. In some instances, a chemical conversion system may utilize micro- or nanostructured membrane unit operations for distinct operations, such as the reaction of one or more chemical species or the separation of one or more chemical species. In some instances, a chemical conversion system may utilize a single micro- or nanostructured membrane unit operation for multiple operations, such as simultaneous reaction and separation of one or more chemical species. In some instances, a chemical conversion system may comprise a plurality of unit operations comprising a membrane that comprises a micro- or nanostructured material. In some instances, a plurality of unit operations may be working redundantly on a particular process, for example multiple CO or $CO_2$ to formate chemical reactors. In other instances, a plurality of unit operations may be performing a range of processes, for example chemical reactors tailored to produce hydrocarbons with varying molecular weight ranges.

Any unit operation in a chemical conversion system may be designed to operate in a batch, semi-batch, or continuous mode. Any unit operation in a chemical conversion system may have one or more feed streams. Any unit operation in a chemical conversion system may have one or more product streams. A unit operation in a chemical conversion system may utilize one or more recycle or purge streams to control its function. In some instances, a unit operation capable of multiple processes (e.g. reaction and separation) may operate continuously. In some instances, a unit operation capable of multiple processes may operate cyclically between modes of operation.

A chemical conversion system of the present invention may comprise any number of additional operations beyond the membrane-based unit operations. A chemical conversion system may comprise one or more unit operations for separations. Separation unit operations may include distillation columns, reactive distillation columns, gas absorption columns, stripping columns, additional catalysis operations, such as with catalyst packed columns, flash tanks, humidifiers, leaching units, liquid-liquid extraction units, dryers, adsorption systems, ion-exchange columns, membrane separation units, filtration units, sedimentation units, and crystallization units. A chemical conversion system may comprise one or more unit operations for heat transfer. Heat transfer unit operations may include mantle heaters, cartridge heaters, tape heaters, pad heaters, resistive heaters, radiative heaters, fan heaters, shell-and-tube heat exchangers, plate-type heat exchangers, extended-surface heat exchangers, scraped-surface heat exchangers, condensers, vaporizers, and evaporators. A chemical conversion system may comprise one or more unit operations for fluid transfer. Fluid transfer devices may include piping, tubing, fittings, valves, pumps, fans, blowers, compressors, stirrers, agitators, and blenders. Pumping equipment may be operated at pressures above atmospheric pressure or used to draw a vacuum. A chemical conversion system may comprise one or more chemical reaction units aside from an electrochemical reduction reactor. Chemical reaction units may include plug flow reactors, continuous-stirred tank reactors, packed bed columns, fluidized bed reactors, and batch reactors. Chemical reactors may be utilized for various upgrading and conversions including dehydrogenation, hydrogenation, cracking, dehydration, decarboxylation, carboxylation, amination, deamination, alkylation, dealkylation, oxidation, reduction, polymerization, and depolymerization.

A chemical conversion system may have one or more pieces of equipment for process control or process safety. A chemical conversion system may contain one or more thermocouples, temperature gauges, pressure gauges, rotameters, mass flow controllers, pH probes, chemical analyzers, velocity gauges, infrared sensors, flow sensors, PID control devices, PLC control devices, purge valves, purge lines, and recycle lines. A chemical conversion system may be under operative control by one or more computers or computer systems.

Any unit operation within a chemical conversion system, including a central electrochemical reduction unit, may have at least one feed or input stream. Any unit operation within a chemical conversion system, including a central electrochemical reduction unit, may have at least one product or outlet stream. Any feed or input stream and product or outlet stream may comprise one or more inline unit operations for processes such as fluid transfer, heat transfer, mass transfer, chemical reaction, or process control.

A chemical conversion system comprising one or more micro- or nanostructured membranes may reduce or eliminate the energy consumption associated with one or more unit operations. For example, a gas separator comprising one or more micro- or nanostructured membranes may eliminate the need for a distillation column or separate adsorption system to separate CO or $CO_2$ from air. In some instances, the utilization of unit operations comprising micro- or nanostructured membranes may eliminate one or more pumps, compressors, heat exchangers, separators, or reactors from an electrochemical reduction system. The utilization of one or more micro- or nanostructured membranes may reduce the energy consumption of a processing step or processing component by at least about 5%, 10%, 15%, 20%, 25%, 30%, 35%, 40%, 45%, 50%, 55%, 60%, 65%, 70%, 75%, 80%, 85%, 90%, 95%, 99% or more.

A chemical conversion system may comprise one or more energy generation devices. Energy generation devices may comprise renewable energy generation devices such as photovoltaic cells, solar concentration heaters, wind turbines, water turbines, biomass combustion systems, and biomass gasifiers. A chemical conversion system may be in direct electrical connection with an energy source such as a nuclear power source or a geothermal power source. A renewable energy source may provide the electrical energy source necessary to electrochemically reduce CO or $CO_2$ to other chemicals. A renewable energy source may provide the electrical energy source necessary to perform any other unit operation necessary to produce a chemical product. A renewable energy source may include solar power sources (e.g. photovoltaic cells) geothermal power sources, hydroelectric power sources, nuclear power sources, tidal power sources, wind power sources, biomass power sources, or any combination thereof. In some instances, a chemical conversion system may be entirely self-sustaining, i.e. no external power supply is necessary. In other instances, a chemical conversion system may reduce the external power demand of a chemical production process when compared to a conventional production method. In some cases, power generation systems may be employed to make use of nontarget byproducts, such as with a fuel cell for conversion of hydrogen, methane, or CO with oxygen to create electricity, which may be used in the electrochemical process.

A chemical conversion system may reduce the external power demand of a chemical process by at least about 5%, 10%, 15%, 20%, 25%, 30%, 35%, 40%, 45%, 50%, 55%, 60%, 65%, 70%, 75%, 80%, 85%, 90%, 95%, 96%, 97%, 98%, 99% or more. In some instances, a chemical conversion system may generate fuels with a greater energy content than the total external energy consumed to produce the fuels. A chemical conversion system may reduce the carbon footprint for the production of one or more chemicals.

A chemical conversion system may reduce the net carbon emissions of a chemical production process. The total carbon emissions of a chemical production process may decrease by at least about 5%, 10%, 15%, 20%, 25%, 30%, 35%, 40%, 45%, 50%, 55%, 60%, 65%, 70%, 75%, 80%, 85%, 90%, 95%, 96%, 97%, 98%, 99% or more. In some instances, a chemical production process may be net carbon negative, i.e. more carbon is sequestered in a product than is released by the production of the product. A chemical conversion system may be utilized to reduce the net carbon emissions of another chemical process. In some instances, a chemical conversion system may be coupled to an effluent gas source (e.g. a power plant flue gas stream) to minimize the total carbon dioxide release from the effluent gas source. A chemical conversion system may reduce the total carbon emissions of another system or source by at least about 5%, 10%, 15%, 20%, 25%, 30%, 35%, 40%, 45%, 50%, 55%, 60%, 65%, 70%, 75%, 80%, 85%, 90%, 95%, 96%, 97%, 98%, 99% or more.

Chemical Reduction Systems and Methods

The present disclosure provides chemical conversion systems that convert CO or $CO_2$ to other chemicals via an electrochemical reduction system. In some instances, the electrochemical conversions system may produce hydrocarbons in the liquid phase via the electrochemical reduction of bicarbonate ions that are produced by the reaction of CO or $CO_2$ with water. The electrochemical reduction system may generate bicarbonate ions via the capture of CO or $CO_2$ from various sources, including atmospheric carbon dioxide and effluent gases from an industrial or chemical process. In some instances, the chemical reduction system may reduce the energy consumption of a CO or $CO_2$ reduction process by at least about 5%, 10%, 15%, 20%, 25%, 30%, 35%, 40%, 45%, 50%, 55%, 60%, 65%, 70%, 75%, 80%, 85%, 90%, 95%, 96%, 97%, 98%, 99% or more. In some instances, a CO or $CO_2$ reduction system may utilize a feed stream comprising carbon dioxide without the need for further purification. In some instances, a CO or $CO_2$ reduction system may utilize a feed stream comprising CO or $CO_2$ without the need for additional separation processes that enrich the CO or $CO_2$ composition of the feed stream. A feed stream to an electrochemical reduction system may comprise carbon dioxide on a molar basis of about 0.01%, 0.02%, 0.03%, 0.04%, 0.05%, 0.06%, 0.07%, 0.08%, 0.09%, 0.1%, 0.2%, 0.5%, 1%, 5%, 10%, 20%, 50%, 90%, 95% or more. A feed stream to an electrochemical reduction system may comprise carbon dioxide on a molar basis of at least about 0.01%, 0.02%, 0.03%, 0.04%, 0.05%, 0.06%, 0.07%, 0.08%, 0.09%, 0.1%, 0.2%, 0.5%, 1%, 5%, 10%, 20%, 50%, 90%, 95% or more. A feed stream to an electrochemical reduction system may comprise carbon dioxide on a molar basis of no more than about 95%, 90%, 50%, 20%, 10%, 5%, 1%, 0.5%, 0.2%, 0.1%, 0.09%, 0.08%, 0.07%, 0.06%, 0.05%, 0.04%, 0.03%, 0.02%, or 0.01% or less.

An electrochemical reduction system may produce hydrocarbons at a specific rate based upon the available surface area for electrochemical reduction. An electrochemical reduction system may produce hydrocarbons at a rate of about 10 kilograms/meter squared/hour ($kg/m^2/hr$), 20 $kg/m^2/hr$, 30 $kg/m^2/hr$, 40 $kg/m^2/hr$, 50 $kg/m^2/hr$, 60 $kg/m^2/hr$, 70 $kg/m^2/hr$, 80 $kg/m^2/hr$, 90 $kg/m^2/hr$, 100 $kg/m^2/hr$, 150 $kg/m^2/hr$, or about 200 $kg/m^2/hr$. An electrochemical reduction system may produce hydrocarbons at a rate of about 10 $kg/m^2/hr$, 20 $kg/m^2/hr$, 30 $kg/m^2/hr$, 40 $kg/m^2/hr$, 50 $kg/m^2/hr$, 60 $kg/m^2/hr$, 70 $kg/m^2/hr$, 80 $kg/m^2/hr$, 90 $kg/m^2/hr$, 100 $kg/m^2/hr$, 150 $kg/m^2/hr$, or about 200 $kg/m^2/hr$ or more. An electrochemical reduction system may produce hydrocarbons at a rate of no more than about 200 $kg/m^2/hr$, 150 kg/m²/hr, 100 kg/m²/hr, 90 kg/m²/hr, 80 kg/m²/hr, 70 kg/m²/hr, 60 kg/m²/hr, 50 kg/m²/hr, 40 kg/m²/hr, 30 kg/m²/hr, 20 kg/m²/hr, or 10 kg/m²/hr or less.

An electrochemical reduction system may have a selectivity for the conversion of CO or $CO_2$ to one or more chemical species. In some instances, a selectivity may be defined as the percentage of carbon atoms entering a reactor, system, or unit that are converted to a product species. For example, a selectivity of 50% may indicate that 50% of entering CO or $CO_2$ molecules were converted to a hydrocarbon species in a reactor, system or unit. In some instances, a selectivity may be defined as the percentage of carbon atoms entering a reactor, system, or unit that are converted to a chemical species within a particular class, weight range, carbon number range, or other characteristic. For example, a selectivity of 50% C1-C4 may indicate that 50% of entering CO or $CO_2$ molecules were converted to a C1 to C4 hydrocarbon product. A selectivity may be a single-pass selectivity. A single-pass selectivity may be defined as the percentage of carbon atoms entering a reactor, system, or unit that are converted to a hydrocarbon product on a single pass through the reactor, system, or unit. A selectivity may be a recycled selectivity. A recycled selectivity may be defined as the percentage of carbon atoms entering a reactor, system, or unit that are converted to a hydrocarbon product on two or more passes through the reactor, system, or unit.

An electrochemical reduction system may have a selectivity of about 10%, 20%, 30%, 40%, 50%, 60%, 70%, 80%, 90%, 95%, or about 99%. An electrochemical reduction system may have a selectivity of at least about 10%, 20%, 30%, 40%, 50%, 60%, 70%, 80%, 90%, 95%, or about 99% or more. An electrochemical reduction system may have a selectivity of no more than 99%, 95%, 90%, 80%, 70%, 60%, 50%, 40%, 30%, 20%, or 10% or less.

An electrochemical reduction system for the conversion of CO or $CO_2$ into other chemicals may comprise various components that may be necessary for the reduction of CO or $CO_2$. Components may include cathodes, anodes, contactors, extractors, pumps, vapor-liquid separators, and ion exchange membranes. In some instances, some components may be included or excluded from a chemical reduction system depending upon the preferred embodiment of the device. In some instances, a chemical reduction system may be a single, stand-alone, or fully integrated system that performs all processes in the electrochemical reduction of CO or $CO_2$. In other instances, an electrochemical reduction system may comprise at least two or more operatively linked unit operations that collectively perform the necessary processes in the electrochemical reduction of CO or $CO_2$.

An electrochemical reduction system may comprise a housing. The housing may provide various functions to the electrochemical reduction system, including without limitation: securing components (e.g., membranes), physically containing fluids, separating differing fluids within a single unit, retaining temperature or pressure, and/or providing insulation. The housing may comprise any suitable material, including metals, ceramics, refractories, insulations, plastics, and glasses. The housing may comprise one unit of an electrochemical reduction system (e.g., a cathode). The housing may comprise two or more units of an electrochemical reduction system (e.g., a cathode and anode). A complete electrochemical reduction system may be contained within a single housing.

The housing may include one or more walls. The housing may include one or more compartments. The housing may have a cross-section that is circular, triangular, square, rectangular, pentagonal, hexagonal, or partial shapes or combinations of shapes thereof. The housing may be single-piece or formed of multiple pieces (e.g., pieces welded together). The housing may include a coating on an interior portion thereof. Such coating may prevent reaction with a surface in the interior portion of the housing, such as corrosion or an oxidation/reduction reaction with the surface.

An electrochemical reduction system may comprise a cathode, an anode and an electrolyte solution that collectively provide the necessary components for the reduction of carbon dioxide to other chemical species. The electrolyte may comprise an aqueous salt solution that is composed with an optimal ionic strength and pH for the electrochemical reduction of CO or $CO_2$. An electrolyte may comprise an aqueous salt solution comprising bicarbonate ions. In some instances, an electrolyte may comprise an aqueous solution of sodium bicarbonate or potassium bicarbonate. In some instances, bicarbonate ions may dissociate in the presence of one or more catalysts to produce CO or $CO_2$ molecules for a reduction reaction. The dissolution of CO or $CO_2$ into the electrolyte solution may regenerate or maintain the optimal concentration of bicarbonate ions.

An electrochemical reduction system may be configured to operate at an optimal processing temperature. An electrochemical reduction system or any component thereof may have an operating temperature of about −30° C., −20° C., −10° C., 0° C., 5° C., 10° C., 15° C., 20° C., 25° C., 30° C., 35° C., 40° C., 50° C., 60° C., 70° C., or about 80° C. An electrochemical reduction system or any component thereof may have an operating temperature of at least about −30° C., −20° C., −10° C., 0° C., 5° C., 10° C., 15° C., 20° C., 25° C., 30° C., 35° C., 40° C., 50° C., 60° C., 70° C., or about 80° C. or more. An electrochemical reduction system or any component thereof may have an operating temperature of no more than about 80° C., 75° C., 70° C., 65° C., 60° C., 55° C., 50° C., 45° C., 40° C., 35° C., 30° C., 25° C., 20° C., 15° C., 10° C., 5° C., 0° C., −5° C., −10° C., −20° C., or about −30° C. or less.

An electrochemical reduction system may be configured to operate at an optimal voltage for the reduction of CO or $CO_2$ to reduced products. An electrochemical reduction system may be arranged in a stack or series configuration to tailor the system voltage to an optimal value. An electrochemical reduction system may have an operating voltage of about 0.1 volts (V), 0.2V, 0.3V, 0.4V, 0.5V, 0.75V, 1.0V, 2.0V, 3.0V, 4.0V, 5.0V, 10 V, 15V, or about 20V. An electrochemical reduction system may have an operating voltage of at least about 0.1 volts (V), 0.2V, 0.3V, 0.4V, 0.5V, 0.75V, 1.0V, 2.0V, 3.0V, 4.0V, 5.0V, 10 V, 15V, or about 20V or more. An electrochemical reduction system may have an operating voltage of no more than about 20V, 15V, 10V, 5.0V, 4.0V, 3.0V, 2.0V, 1.0V, 0.75V, 0.5V, 0.4V, 0.3V, 0.2V, or about 0.1V or less.

An electrochemical reduction system may have an optimal cathode current density. In some instances, the cathode current density may determine the rate of CO or $CO_2$ reduction at the cathode. A cathode may be characterized by an overall electrochemical efficiency. An overall electrochemical efficiency may be defined as the percentage of electrical energy converted into chemical energy. A cathode may have a cathode current density of about 10 milliAmps/square centimeter (mA/cm²), 50 mA/cm², 100 mA/cm², 150 mA/cm², 200 mA/cm², 250 mA/cm², 300 mA/cm², 350 mA/cm², 400 mA/cm², 450 mA/cm², 500 mA/cm², 600 mA/cm², 700 mA/cm², 800 mA/cm², 900 mA/cm², or about 1000 mA/cm². A cathode may have a cathode current density of at least about 10 mA/cm², 50 mA/cm², 100 mA/cm², 150 mA/cm², 200 mA/cm², 250 mA/cm², 300 mA/cm², 350 mA/cm², 400 mA/cm², 450 mA/cm², 500 mA/cm², 600 mA/cm², 700 mA/cm², 800 mA/cm², 900 mA/cm², or about 1000 mA/cm² or more. A cathode may have a cathode current density of no more than about 1000 mA/cm², 900 mA/cm², 800 mA/cm², 700 mA/cm², 600 mA/cm², 500 mA/cm², 450 mA/cm², 400 mA/cm², 350 mA/cm², 300 mA/cm², 250 mA/cm², 200 mA/cm², 150 mA/cm², 100 mA/cm², 50 mA/cm², 10 mA/cm² or less.

A cathode in an electrochemical reduction system may have an overall electrochemical efficiency. A cathode may have an overall electrochemical efficiency of about 5%, 10%, 15%, 20%, 25%, 30%, 35%, 40%, 45%, 50%, 55%, 60%, 65%, 70%, 75%, 80%, 85%, 90%, 95% or more. A cathode may have an overall electrochemical efficiency of at least about 5%, 10%, 15%, 20%, 25%, 30%, 35%, 40%, 45%, 50%, 55%, 60%, 65%, 70%, 75%, 80%, 85%, 90%, 95% or more. A cathode may have an overall electrochemical efficiency of no more than about 95%, 90%, 85%, 80%, 75%, 70%, 65%, 60%, 55%, 50%, 45%, 40%, 35%, 30%, 25%, 20%, 15%, 10%, 5% or less.

An electrolyte may comprise a solution with a particular ionic strength or molarity. An electrolyte may have an ionic strength of about 0.01 moles/liter (M), 0.05M, 0.1M, 0.2M, 0.3M, 0.4M, 0.5M, 0.6M, 0.7M, 0.8M, 0.9M, 1.0M, 1.1M, 1.2M, 1.3M, 1.4M, 1.5M, 2.0M, 2.5M, or about 3.0M. An electrolyte may have an ionic strength of at least about 0.01M, 0.05M, 0.1M, 0.2M, 0.3M, 0.4M, 0.5M, 0.6M, 0.7M, 0.8M, 0.9M, 1.0M, 1.1M, 1.2M, 1.3M, 1.4M, 1.5M, 2.0M, 2.5M, or at least about 3.0M or more. An electrolyte may have an ionic strength of no more than about 3.0M, 2.5M 2.0M, 1.5M, 1.4M, 1.3M, 1.2M, 1.1M, 1.0M, 0.9M, 0.8M, 0.7M, 0.6M, 0.5M, 0.4M, 0.3M, 0.2M, 0.1M, 0.05M, or no more than about 0.01M or less. A salt in an electrolyte may have a molarity of about 0.01 moles/liter (M), 0.05M, 0.1M, 0.2M, 0.3M, 0.4M, 0.5M, 0.6M, 0.7M, 0.8M, 0.9M, 1.0M, 1.1M, 1.2M, 1.3M, 1.4M, 1.5M, 2.0M, 2.5M, or about 3.0M. A salt in an electrolyte may have a molarity of at least about 0.01M, 0.05M, 0.1M, 0.2M, 0.3M, 0.4M, 0.5M, 0.6M, 0.7M, 0.8M, 0.9M, 1.0M, 1.1M, 1.2M, 1.3M, 1.4M, 1.5M, 2.0M, 2.5M, or at least about 3.0M or more. A salt in an electrolyte may have a molarity of no more than about 3.0M, 2.5M 2.0M, 1.5M, 1.4M, 1.3M, 1.2M, 1.1M, 1.0M, 0.9M, 0.8M, 0.7M, 0.6M, 0.5M, 0.4M, 0.3M, 0.2M, 0.1M, 0.05M, or no more than about 0.01M or less. A salt in an electrolyte may have a molarity in a range from about 0.01M to about 0.1M, about 0.01M to about 0.2M, about 0.01M to about 0.5M, about 0.01M to about 1.0M, about 0.01M to about 3.0M, about 0.1M to about 0.2M, about 0.1M to about 0.5M, about 0.1M to about 1.0M, about 0.1M to about 3.0M, about 0.2M to about 0.5M, about 0.2M to about 1.0M, about 0.2M to about 3.0M, about 0.5M to about 1.0M, about 0.5M to about 3.0M, or about 1.0M to about 3.0M.

An electrolyte may have an optimal pH for the electrochemical reduction of $CO_2$. An electrolyte may have a pH of about 0, 1, 2, 3, 4, 5, 6, 7, 8, 9, 10, 11, 12, 13, or about 14. An electrolyte may have a pH of at least about 0, 1, 2, 3, 4, 5, 6, 7, 8, 9, 10, 11, 12, 13, 14 or more. An electrolyte may have a pH of no more than about 14, 13, 12, 11, 10, 9, 8, 7, 6, 5, 4, 3, 2, 1, 0 or less. An electrolyte may have a pH in a range from about 0 to about 2, about 0 to about 3, about 0 to about 4, about 0 to about 5, about 0 to about 7, about 0 to about 10, about 0 to about 14, about 2 to about 3, about 2 to about 4, about 2 to about 5, about 2 to about 7, about 2 to about 10, about 2 to about 14, about 3 to about 4, about 3 to about 5, about 3 to about 7, about 3 to about 10, about 3 to about 14, about 4 to about 5, about 4 to about 7, about 4 to about 10, about 4 to about 14, about 5 to about 7, about 5 to about 10, about 5 to about 14, about 7 to about 10, about 7 to about 14, or from about 10 to about 14.

An electrolyte in an electrochemical reduction system may be a non-aqueous electrolyte. In some instances, an electrolyte may comprise an ionic liquid with a dissolved salt. An ionic liquid may include, but is not limited to, midazolium-based fluorinated anion ionic liquids, midazolium acetates, midazolium fluoroacetates, pyrrolidinium ionic liquids, or any combination thereof.

An anode may comprise an elemental metal such as nickel, tin, or gold. An anode may comprise a wire mesh, metal foam or other permeable structure of the chosen anode material. An anode material may be in operative contact with an anion exchange membrane material or another physical separator that prevents contact with the cathode.

A cathode may comprise any appropriate material. In some instances a cathode may comprise copper nanoparticles and/or N-doped carbon nanomaterials. In some instances, a cathode may comprise a micro- or nanostructured membrane material. In some instances, a cathode may comprise one or more catalysts for the electrochemical reduction of CO or $CO_2$ or other chemical reactions. A cathode material may be in operative contact with an anion exchange membrane material or another physical separator that prevents contact with the cathode. In some instances, the distance between the cathode and anode may be minimized to reduce resistance. In some instances, forced convective flow of electrolyte between the electrodes may further reduce electrical resistance and/or may allow for greater distance between the electrodes. In some instances the electrodes may be in different housings. In some instances, the anode and cathode may have a minimal distance with an ion selective membrane between them. In some instances no ion selective membrane may be used.

An electrochemical reduction system may comprise one or more extractor units. An extractor unit may comprise any unit operation or separation unit that selectively separates one or more chemical species from a feed stream. In some instances, an extractor may comprise a membrane separator. In some instances, an extractor may comprise a micro- or nanostructured membrane. In some instances, an extractor may extract one or more chemical species derived from the reduction of carbon dioxide. In some instances, an extractor may extract one or more chemical species derived from the reduction of CO or $CO_2$ from an electrolyte solution. In other instances, an extractor may separate one or more chemical species derived from the subsequent reaction of carbon dioxide electrochemical reduction products.

An electrochemical reduction system may comprise one or more contactor units. A contactor unit may comprise any unit operation or separation unit that selectively separates one or more chemical species from a feed stream. In some instances, a contactor may comprise a gas adsorption column. In other instances, a contactor may comprise packing to increase a liquid solutions surface area and a fan to increase gas passage at the liquid interface. Such contactors may share design features with cooling towers. In other instances, an extractor may comprise a membrane separator. In some instances, an extractor may comprise a micro- or nanostructured membrane. In some instances, a contactor may extract one or more chemical species from a feed stream. In some instances, a contactor may extract carbon dioxide from a feed stream. In some instances, a contactor may separate CO or $CO_2$ from a feed stream and dissolve the CO or $CO_2$ in an electrolyte solution. In some cases a feed stream may be air. In some cases the feed stream may be filtered prior to use. Such filtering may in some cases remove particulate matter and/or volatile organic materials and/or undesired materials of various kinds. The uptake of CO or $CO_2$ in a gas contactor may be enhanced by the presence of hydroxide ions generated within the electrochemical reduction system.

An electrochemical reduction system may comprise one or more ion exchange membranes. An ion exchange membrane may comprise a cation exchange membrane, an anion exchange membrane, or a bipolar membrane. An ion exchange membrane may be in operative contact with a cathode, an anode, or both a cathode and anode. In some instances, an electrochemical reduction system may comprise no ion exchange membranes.

Figure 6:
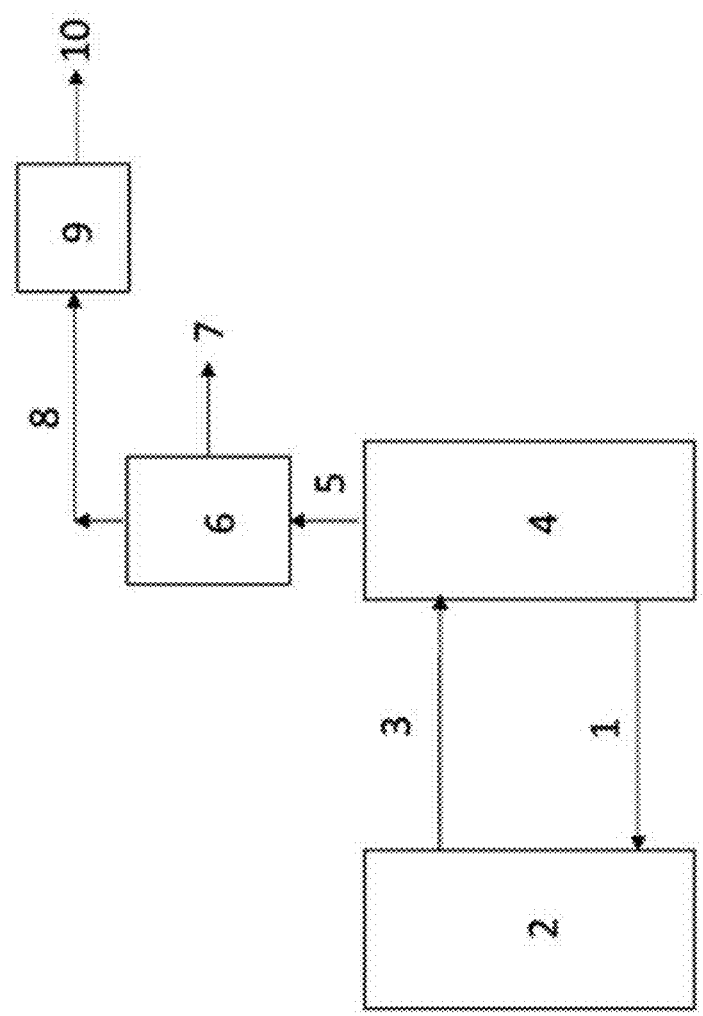
FIG. 6 depicts a schematic of another embodiment of an electrochemical reduction system for the conversion of CO or $CO_2$ to hydrocarbons.

Various embodiments of chemical reduction systems utilizing micro- or nanostructured membranes may be conceived. In an embodiment, depicted in FIG. 6, an electrolyte solution with an optimal pH (1) may be introduced to a chemical reduction unit (2), where $CO_2$ is introduced to the electrolyte and reduced by a catalyst to useful reduced carbon products (RCPs). In some instances, $CO_2$ is captured in a separate unit operation and introduced into the chemical reduction unit as a gas. In some instances, $CO_2$ is captured in a separate unit operation and introduced as a component of the electrolyte. In some instances, the chemical reduction unit may consist of various housings, tanks, pumps, or other elements used to operate the unit. In some cases, separate catholyte and anolyte reservoirs may be used. In some cases, pumping may be used to circulate catholyte and anolyte to an electrolysis stack. In some instances, the catholyte reservoir may also be a vapor liquid separator. In some instances, heat exchangers and cooling or heating systems may be used to maintain desired temperatures in the various reservoirs, stack, or other unit elements. In some instances, the chemical reduction unit (2) may comprise a micro- or nanostructured membrane. The micro- or nanostructured membrane may comprise one or more catalysts. In other instances, a catalysis process may comprise a conventional electrochemical "stack", comprising an anode and cathode within the same housing. In some instances, an ion exchange membrane may be used. In some instances, various catalytic membranes may be used, or otherwise achieve the desired reduction of $CO_2$ by other methods of reduction. Oxygen or other oxidized species may also be produced by such a process and released to the atmosphere or directed to beneficial use. An stream containing RCPs (3) is directed to an extractor (4), where the RCPs are extracted. In some instances, the RCP stream is a liquid electrolyte. In some instances, the RCP stream is a vapor. In some instances, the RCP stream is a vapor collected from the gas space above the electrolyte. In some instances the gas space is integral to the chemical reduction unit. In some cases, the gas space is part of a vapor liquid separator which may be in a separate casing. In some instances the vapor liquid separator may also be the catholyte reservoir. In some instances, the extractor may comprise a membrane extractor. A membrane extractor may comprise a micro- or nanostructured membrane material. RCPs may be extracted through the pores or channels of the micro- or nanostructured membrane due to pressure or chemical potential differences (for example, as produced by a vacuum downstream of the lumen or backing side of the membrane), producing an RCP product stream (5) which is condensed or otherwise collected by a collector unit. A collector unit may comprise a condenser. In some instance, a collector unit may comprise a heat exchange condenser, an adsorption unit or other capture processes. In other instances, the collector system may be understood to mean any of a variety of product capture and/or further processing steps, which may include, by way of non-limiting examples, condensation, adsorption, re-pressurization, further reactions (such as further catalysis for polymerization or other formation of longer chain hydrocarbons, etc). The collected RCPs may be directed to further processes or uses in stream (7). A stream of any non-condensable, non-collectable, or intentionally not collected gases (8) may be recompressed by a vacuum pump (9) and ejected to the environment or collected for further usage in a product stream (10). In some cases, non-collected gases may include reduced matter such as $H_2$, CO, $CH_4$ or other gases, including alcohols. In some cases, non-collected gases may be put to beneficial use. In some instances, beneficial use may include generation of electricity in a fuel cell or other unit operation, which may use $O_2$ generated by the chemical reduction process. In some instances, non-collected gases may be used prior to a vacuum pump. In some instances, non-collected gases may be sold or used to make secondary products. After RCP extraction, the RCP containing stream, which may be substantially depleted of RCPs or may have a baseline recirculated concentration of RCPs (as may be needed to optimize various features or operations of the process, such as, for example, extraction) is returned to the chemical reduction unit as a feed stream (1).

Figure 7:
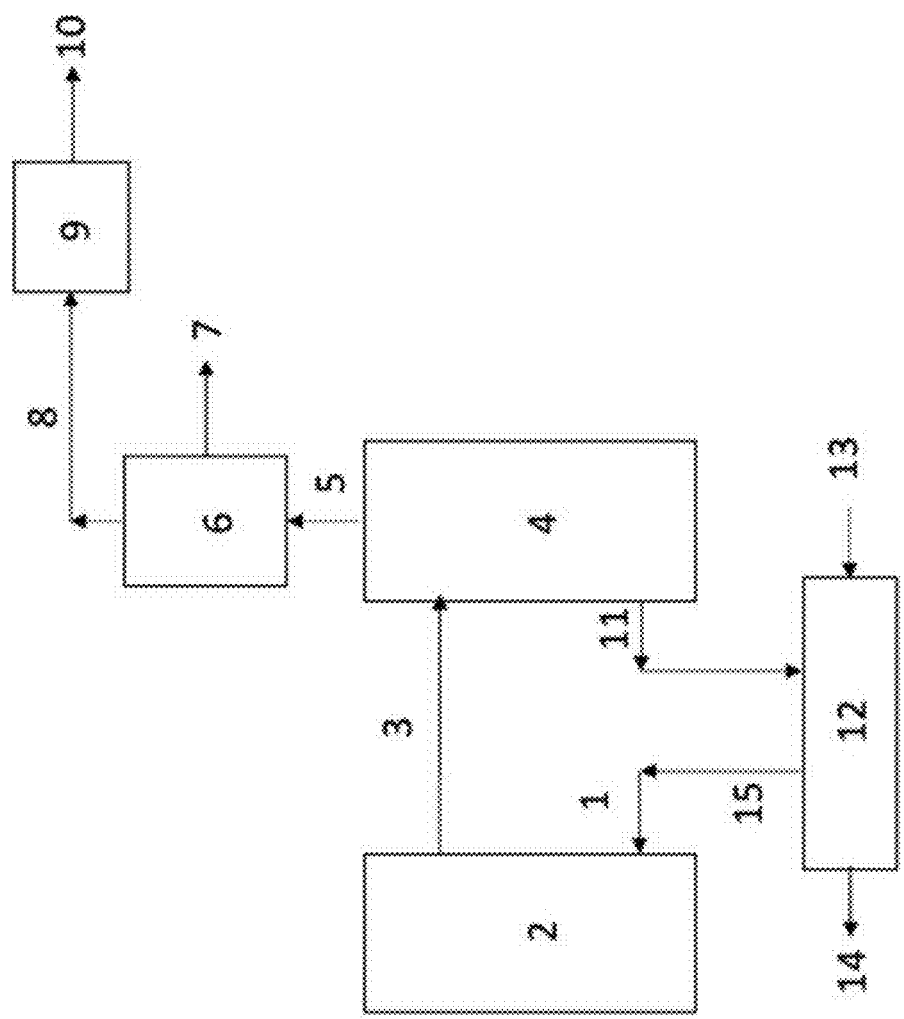
FIG. 7 depicts a schematic of another embodiment of an electrochemical reduction system for the conversion of CO or $CO_2$ to hydrocarbons.

In another embodiment, depicted in FIG. 7, an electrolyte solution (1) may be directed to a chemical reduction unit (2), where CO or $CO_2$ is reduced to RCPs. An electrolyte solution containing RCPs (3) is directed to an extractor (4), where the RCPs are extracted. In some instances, the extractor may employ a vapor liquid separator such that RCPs may be extracted from the vapor stream above the electrolyte. In some instances, the extractor may comprise a membrane extractor. A membrane extractor may comprise a micro- or nanostructured membrane material. RCPs may be extracted through the pores or channels of the micro- or nanostructured membrane due to pressure or chemical potential differences (for example, as produced by a vacuum downstream of the lumen or backing side of the membrane), producing an RCP product stream (5) which is condensed or otherwise collected by a collector unit. A collector unit may comprise a condenser. In some instance, a collector unit may comprise a heat exchange condenser, an adsorption unit or other capture processes. In other instances, the collector system may be understood to mean any of a variety of product capture and/or further processing steps, which may include, by way of non-limiting examples, condensation, adsorption, re-pressurization, further reactions (such as further catalysis for polymerization or other formation of longer chain hydrocarbons, etc). The collected RCPs may be directed to further processes or uses in stream (7). A stream of any non-condensable or otherwise non-collectable gases (8) may be recompressed by a vacuum pump (9) and ejected to the environment or collected for further usage in a product stream (10). The electrolyte stream which may be either largely depleted of RCPs or has some recirculating concentration thereof, is directed to a contactor (12). The contactor may comprise a membrane for separating one or more gases from a gas feed stream, or utilize any other approach for contacting a gas with an electrolyte stream. A contactor membrane may comprise a micro- or nanostructured membrane. A gas feed stream may comprise air, an effluent gas, or any other gas stream comprising CO or $CO_2$ (13). In some instances, the hydroxides formed in the electrolyte in the chemical reduction unit may be the primary adsorbing species in the electrolyte to capture CO or $CO_2$. In some instances, the electrolyte stream in a contactor may have its pH controlled for optimal CO or $CO_2$ adsorption by the addition of hydroxide species, such as sodium hydroxide or potassium hydroxide. A CO or $CO_2$ depleted air stream may be directed to an atmospheric purge of another use. An electrolyte solution with the desired pH and concentration of carbonate species may be returned as a feed stream (1) for reuse in the chemical reduction system.

Figure 8:
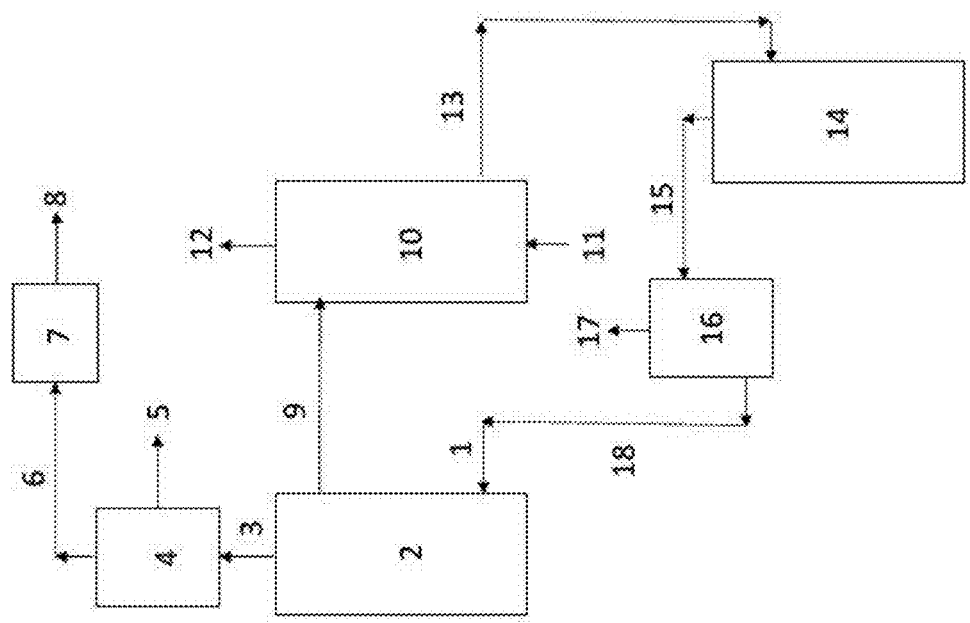
FIG. 8 depicts a schematic of another embodiment of an electrochemical reduction system for the conversion of CO or $CO_2$ to hydrocarbons.

In another embodiment, depicted in FIG. 8, an electrolyte stream is directed to a cathode unit. In some instances, the cathode unit may comprise a micro- or nanostructured membrane. In some instances, the cathode unit may comprise a micro- or nanostructured membrane comprising nitrogen doped carbon nanomaterials with copper nanoparticles (which may include further deposition of NCMs to the membrane surface during its fabrication or thereafter to facilitate improved electrical conductivity or other characteristics). At the cathode unit, CO or $CO_2$ may be reduced to RCPs. The RCPS may be extracted by the a membrane (through the membrane to the backing layer, or lumen) (2), producing an RCP product stream (3) which is collected in a condenser (4), and produced as an RCP product stream (5). Any non-condensable gases (6) may be recompressed by a vacuum pump (7) to maintain system vacuum or otherwise processed, and ejected to the environment or subsequently put to some other use (8). The cathode electrolyte outlet stream (9) is directed to a contactor (10), which may contacts the electrolyte solution with air, an effluent gas, or any other gas stream comprising CO or $CO_2$ (11), allowing the electrolyte to adsorb CO or $CO_2$. CO- or $CO_2$-depleted air is directed to an outlet stream (12). The electrolyte stream containing adsorbed CO or $CO_2$ (13) is directed to an anode unit (14). In some instances, the anode unit is in the same housing as the cathode unit. In some instances, the distance between the cathode and anode are minimized. In some cases, an ion exchange membrane is used between the cathode and anode. An anode may comprise a membrane. In some instances, an anode may comprise a micro- or nanostructured material that may be of any type, such as a membrane comprising a carbon nanomaterial with reduced nanoparticle platinum or a similar catalyst (such as nickel, indium oxide or others with similar performance characteristics, for example). The electrolyte solution may be directed from one side of the membrane to the other to increase mass transfer to the catalyst sites. Oxygen and hydrogen (in the form of hydronium, lowering pH) may be produced in the anode unit, completing the electrocatalytic circuit. The anode unit and the cathode may be electrically connected. In some instance, the anode and cathode units may be incorporated within a single chemical reduction unit. If any residual RCPs are in stream (13), they may be oxidized in the anode unit. In some instances, it may be optimal to have some amount of oxidized RCP species available in the post-anode electrolyte stream to optimize system cost or performance. Electrolyte solution containing oxygen and any CO or $CO_2$ that may have been released by the lowering of the pH of the solution (15) may be directed to a vapor liquid separator unit (VLS) (16), where gases are directed to stream (17), and liquids to stream (18). Liquids produced from a VLS unit may be directed back to the cathode unit for reuse. In this and other embodiments in which an anode and contactor are present, the relative order of these two operations is often interchangeable, in that the contactor may come before the anode, or after, as desired. If the contactor comes after the anode, oxygen release and CO or $CO_2$ capture may potentially be achieved in the same unit operation.

Figure 9:
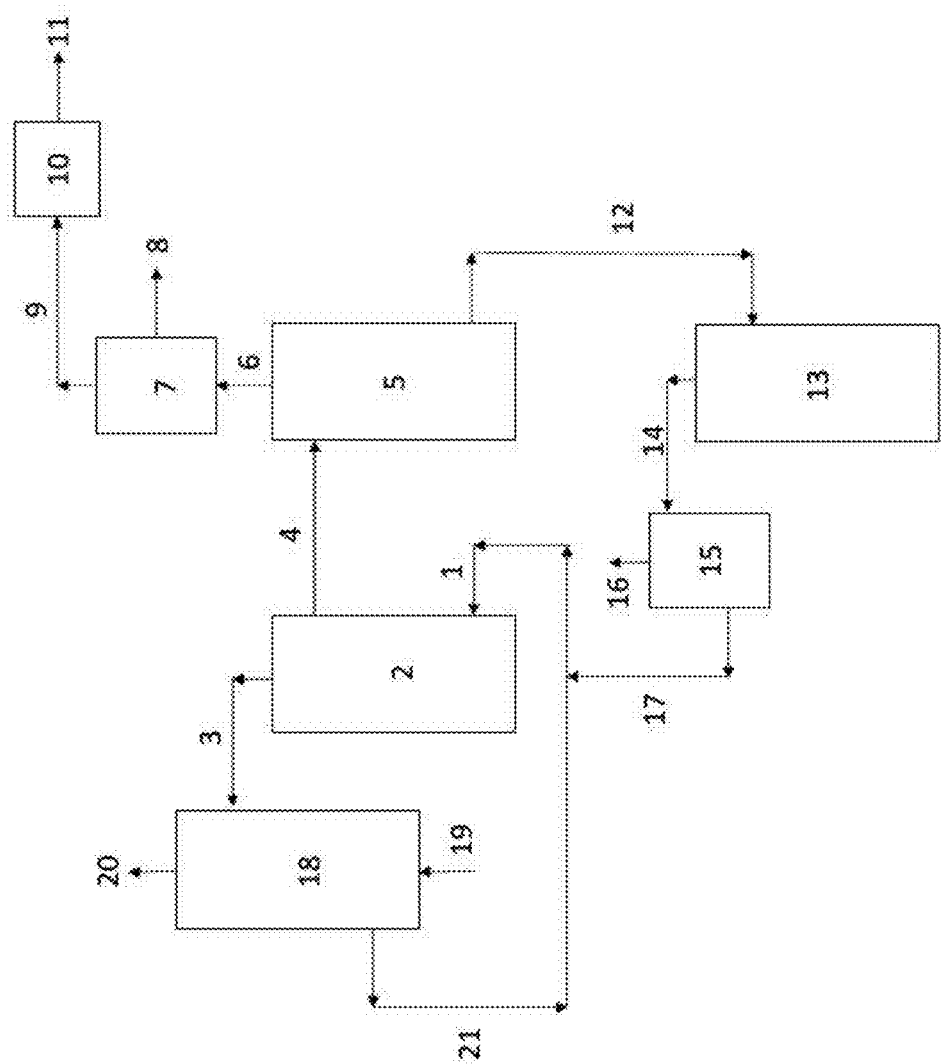
FIG. 9 depicts a schematic of another embodiment of an electrochemical reduction system for the conversion of CO or $CO_2$ to hydrocarbons.

In another embodiment, depicted in FIG. 9, an electrolyte solution (1) is directed to a cathode unit (2). In some instances, the cathode unit may comprise a micro- or nanostructured membrane. In some instances, the cathode unit may comprise a micro- or nanostructured membrane comprising nitrogen doped carbon nanomaterials with copper nanoparticles. The cathode unit membrane may have an external electric field applied axially to the direction of water transport in the nanopores or channels, such that RCPs are substantially rejected by the membrane, such that largely RCP-depleted electrolyte is directed to stream (3), and an electrolyte stream with an increased concentration of RCPs is produced as stream (4). The RCP concentration of stream (4) may be increased with a longer cathode membrane feed channel (removing electrolyte solution while retaining RCPs which are continuously produced at the membrane surface). The RCP containing electrolyte stream (4) may be directed to an extractor (5). In some instances, the extractor may comprise a membrane extractor. A membrane extractor may comprise a micro- or nanostructured membrane material. RCPs may be extracted through the pores or channels of the micro- or nanostructured membrane due to pressure or chemical potential differences (for example, as produced by a vacuum downstream of the lumen or backing side of the membrane), producing an RCP product stream (5) which is condensed or otherwise collected by a collector unit, producing an RCP product stream (8). Any non-condensable gases (9) may be recompressed by a vacuum pump (10) to maintain system vacuum, or subjected to any other processing method, and ejected to the environment or subsequently put to some beneficial use (11). The extractor electrolyte product stream (12) is directed to an anode (13), where oxygen generation and pH reduction may occur. In some instances, the anode unit is in the same housing as the cathode unit. In some instances, the distance between the cathode and anode are minimized. In some cases, an ion exchange membrane is used between the cathode and anode. An oxygen containing stream (14) may be directed to a VLS (15), producing a gas outlet stream (16) and a liquid outlet stream (17). The RCP-depleted electrolyte stream (3) may be directed to a contactor (18), where it is contacted with air, and effluent gas, or any other gas stream comprising $CO_2$ (19), causing adsorption of CO or $CO_2$ to the electrolyte, facilitated by the increase in pH that occurs during the CO or $CO_2$ reduction. CO or $CO_2$ reduced or depleted air may be directed to an outlet stream (20). Electrolyte solution containing RCPs and adsorbed CO or $CO_2$ (21) may be combined or mixed with stream (17), forming an electrolyte stream (1) for reuse in the cathode unit.

Figure 10:
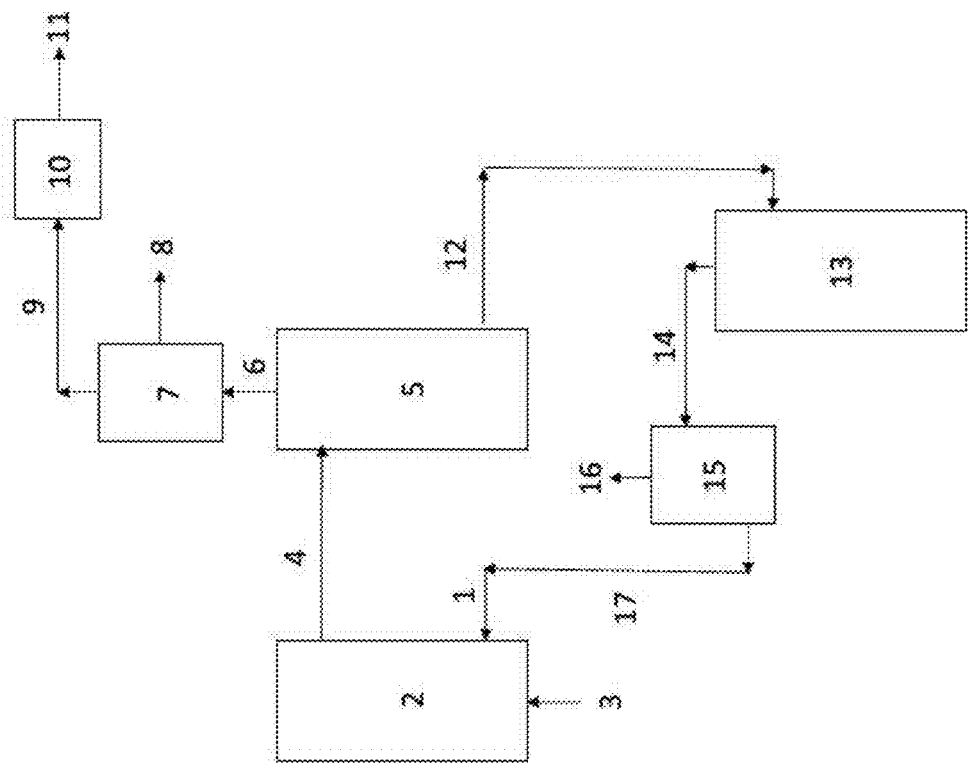
FIG. 10 depicts a schematic of another embodiment of an electrochemical reduction system for the conversion of CO or $CO_2$ to hydrocarbons.

In another embodiment, shown in FIG. 10, an electrolyte stream (1) is directed to a cathode unit comprising a membrane (2). In some instances, the cathode may comprise a micro- or nanostructured membrane. A gas feed stream comprising CO or $CO_2$ (3) is introduced to the electrolyte from the back of the membrane, such that it may become readily available to the catalyst at the membrane surface. The CO or $CO_2$ may be substantially pure, and may be from a variety of sources, including capture from a combustion source, geothermal source, direct air capture, or other sources, as may be desired. An RCP-containing electrolyte stream (4) may be directed to an extractor (5), where RCPs (6) are extracted to a collector (7) and produced as stream (8). Non-condensable gases (NCGs) (9) are directed to a vacuum pump (10) and directed to stream (11). Post-extractor electrolyte solution (12) may be directed to an anode (13). In some instances, the anode unit is in the same housing as the cathode unit. In some instances, the distance between the cathode and anode are minimized. In some cases, an ion exchange membrane is used between the cathode and anode. Oxygen-containing solution (14) produced at the anode may be directed to a VLS (15), producing and outlet gas stream (16) and an outlet liquid stream (17), which may be recycled to the cathode unit.

Figure 11:
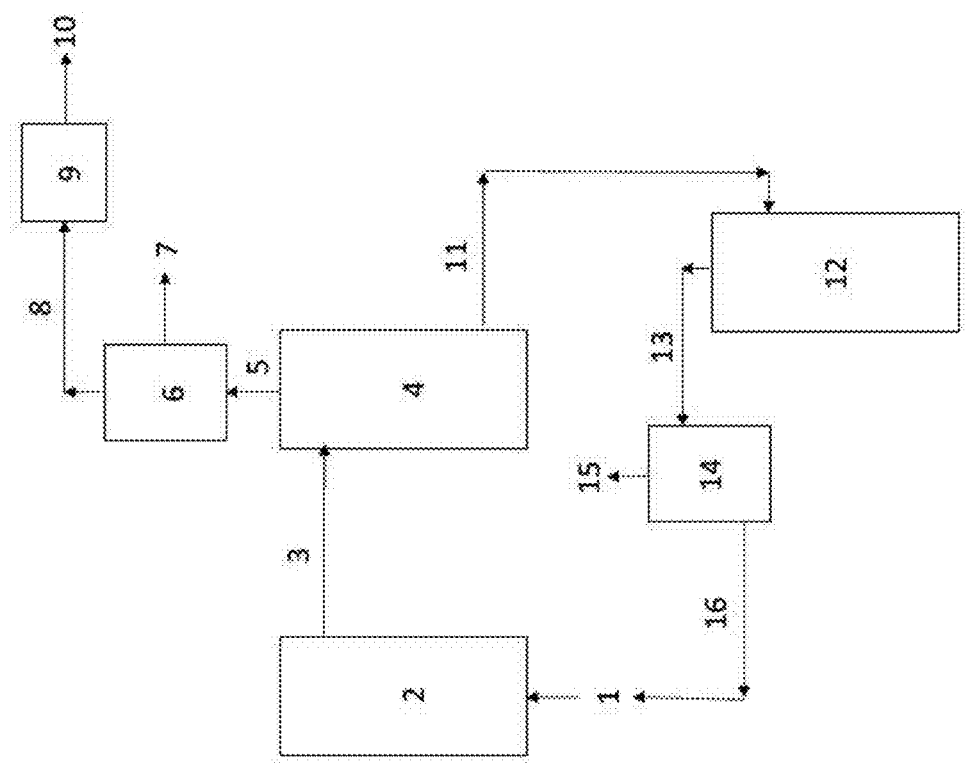
FIG. 11 depicts a schematic of another embodiment of an electrochemical reduction system for the conversion of CO or $CO_2$ to hydrocarbons.

In another embodiment, shown in FIG. 11, an electrolyte solution (1) may introduced to a cathode unit comprising a membrane from the back or lumen side. In some instances, the cathode unit membrane may comprise a micro- or nanostructured membrane. The electrolyte solution may flow to an active catalyst surface, where CO or $CO_2$ is reduced to RCPs. High efficiency utilization of catalyst use may be expected by introducing reactants at an ideal pH directly to the catalyst site in this manner. The RCP-containing electrolyte stream (3) is directed to an extractor (4), where RCPs (5) are extracted to a collector (6), and produced as an RCP product stream (7). Non-condensable gases (NCGs) (8) are directed to a vacuum pump (9) and directed to an outlet stream (10). Post-extractor electrolyte solution (11) is directed to an anode unit (12). In some instances, the anode unit is in the same housing as the cathode unit. In some instances, the distance between the cathode and anode are minimized. In some cases, an ion exchange membrane is used between the cathode and anode. Oxygen-containing solution that may be produced in the anode unit (13) is directed to a VLS (14), producing a gas outlet stream (15) and a liquid outlet stream (16), which becomes a recycled feed stream (1) for reuse.

Figure 12:
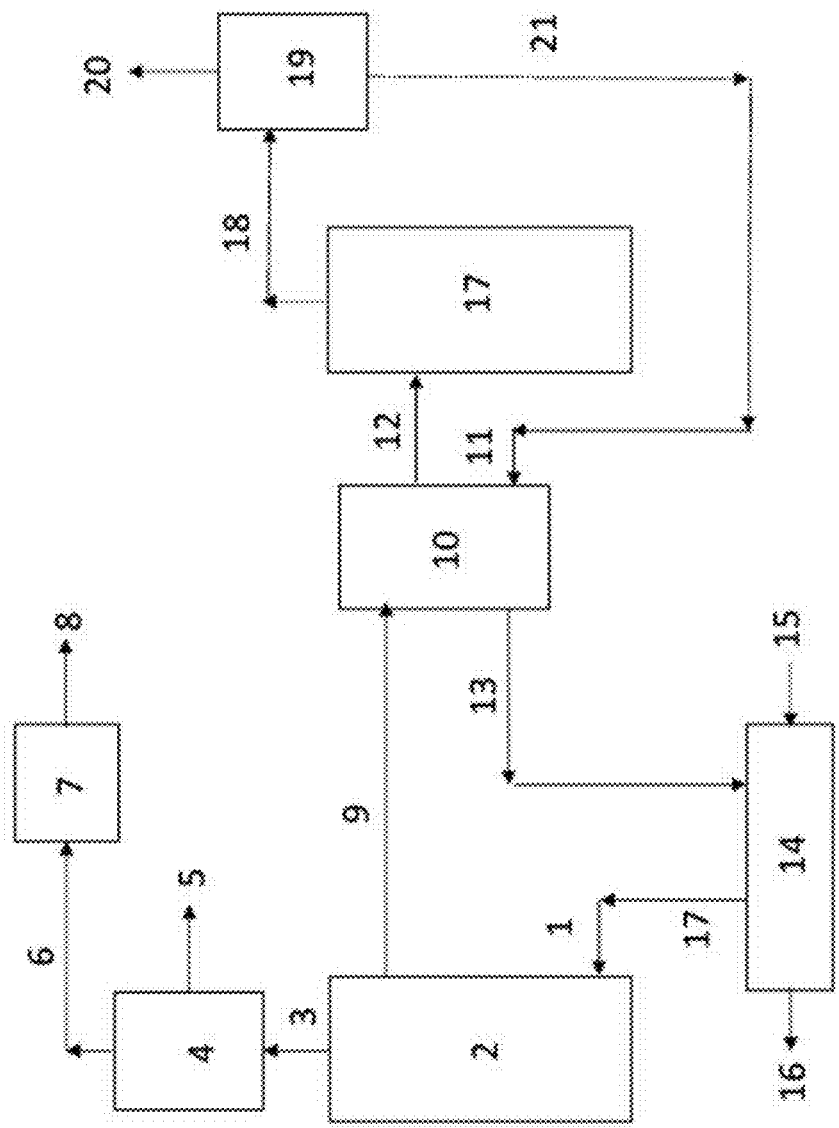
FIG. 12 depicts a schematic of another embodiment of an electrochemical reduction system for the conversion of CO or $CO_2$ to hydrocarbons.

In another embodiment, shown in FIG. 12, an electrolyte solution comprising CO or $CO_2$ (1) is directed to an extracting catalytic membrane (2), where RCPs may be produced. An RCP-containing electrolyte stream (3) may be directed to a condenser (4), and produced as an RCP product stream (5). NCGs (6) are directed to a vacuum pump (7) and become outlet stream 8. A post-extractor electrolyte solution, which may be largely depleted of RCPs or have a desired minimum recirculating concentration of RCPs, is directed to an ion exchange membrane (10), to allow for exchange of either OH— anions (in the case of an anion exchange membrane), or H+ ions (in the case of a proton (or cation) exchange membrane), from stream (11) to equilibrate the pH as required for the continued operation of the catalysis circuit, and to protect RCPs in stream (9) from oxidation that may be expected to occur in contact with the anode or its immediate environment. An ion-exchanged electrolyte stream may be directed to an anode unit (17). In some instances, the anode unit is in the same housing as the cathode unit. In some instances, the distance between the cathode and anode are minimized. In some cases, an ion exchange membrane is used between the cathode and anode. In some instances, the flows indicated are diffusive. In some instances, the flows indicated are recirculating flows intended to assist in the reduction of boundary layers and improve mass transport. This configuration allows a high circulating concentration of RCPs, if desired, which may improve the RCP extraction and/or offer other benefits. The pH equilibrated stream (13) is directed to a contactor (14), where CO or $CO_2$ is adsorbed from air, an effluent gas, or any other gas stream comprising CO or $CO_2$ (15). CO or $CO_2$ depleted air may be directed to outlet stream (16). The reconstituted electrolyte stream (1) may be directed for reuse in the cathode unit. In the anode system, oxygen may be produced and pH may be reduced. Oxygen-containing solution (18) may be directed to a VLS (19), producing outlet product gases (20) and outlet liquids (21), which may be recycled as stream (11) for reuse. In this and other embodiments where both a contactor and an ion exchange membrane are used, the relative order of these operations may be changed, for example having the contactor prior to the ion exchange or vice versa, as may be beneficial to system optimization.

Figure 13:
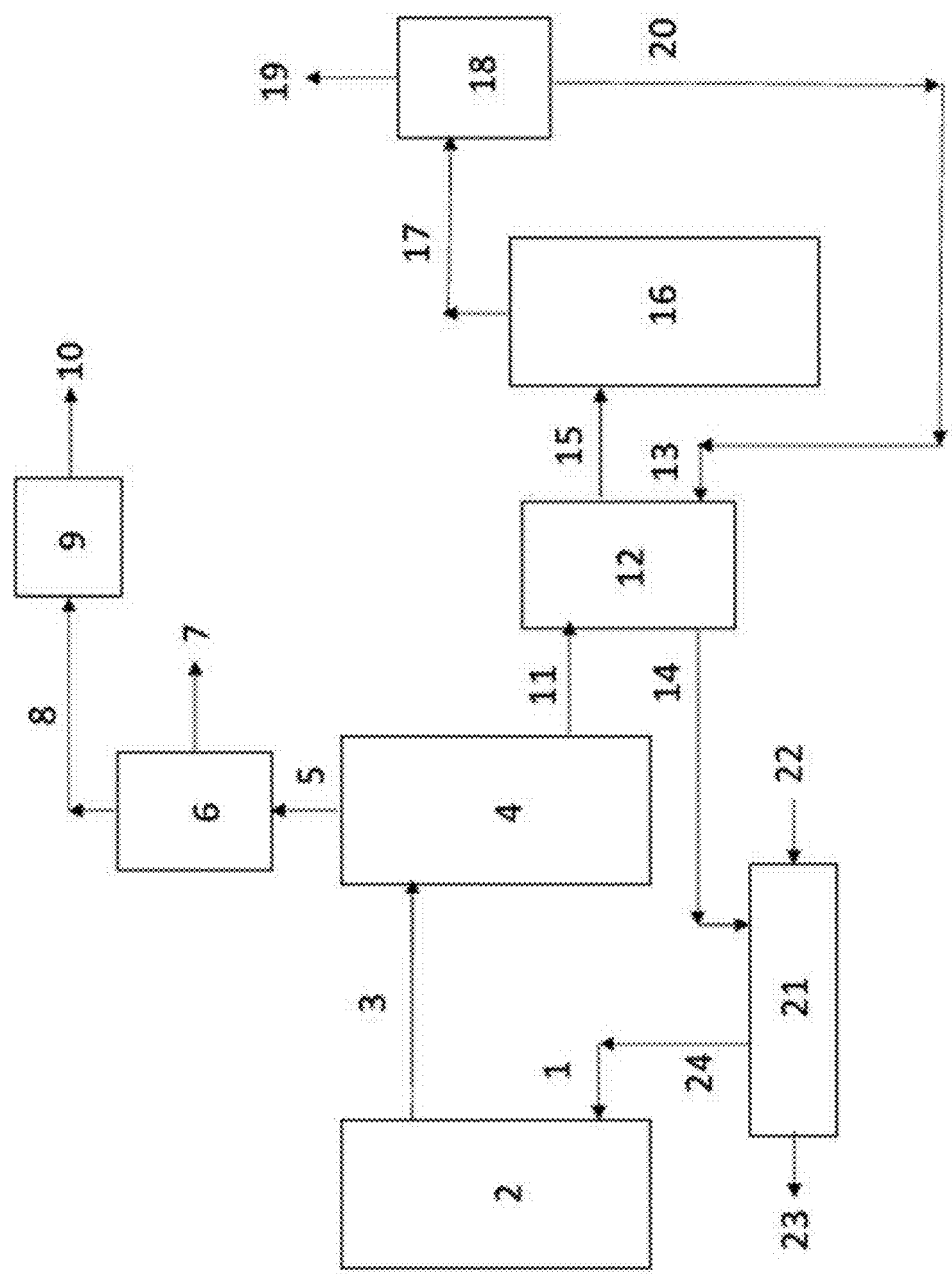
FIG. 13 depicts a schematic of another embodiment of an electrochemical reduction system for the conversion of CO or $CO_2$ to hydrocarbons.

In another embodiment, shown in FIG. 13, an electrolyte solution (1) is directed to a cathode unit (2) where RCPs may be produced. In some instances, the cathode unit may comprise a micro- or nanostructured membrane. In some instances, the cathode unit may comprise a catalyst comprising nitrogen doped carbon nanomaterials with copper nanoparticles. In some instances, the cathode unit may comprise a micro- or nanostructured membrane comprising nitrogen doped carbon nanomaterials with copper nanoparticles. An RCP bearing electrolyte stream (3) is directed to an extractor (4). A substantially purified RCP stream (5) is directed to a collector, producing a product stream (7). NCGs or other non-collected substances (8) are directed to a subsequent separation unit(s) or process, such as a vacuum pump (9), becoming outlet stream (10). Post-extractor electrolyte solution (11) is directed to an ion exchange (IX) membrane (12), where pH is equilibrated between streams (11) and (13), producing electrolyte streams (14) (cathode side), and (15) (anode side). Stream (15) is directed to an anode unit (16) that may produce an oxidized species-rich stream (17), which is directed to a separator device (here denoted VLS) (18), separating the oxidized species from the electrolyte stream (20), which is reused as stream (13). Stream (14) is directed to a contactor, where it is contacted with a CO or $CO_2$ source (22), resulting in a CO or $CO_2$ depleted outlet stream (23), and an electrolyte stream with desired characteristics (24) for recycle to the cathode unit. In some instances, the anode unit is in the same casing as the cathode unit. In some instances, the distance between the cathode and anode are minimized. In some cases, an ion exchange membrane is used between the cathode and anode. In some instances, the flows indicated are diffusive. In some instances, the flows indicated are recirculating flows intended to assist in the reduction of boundary layers and improve mass transport.

Figure 14:
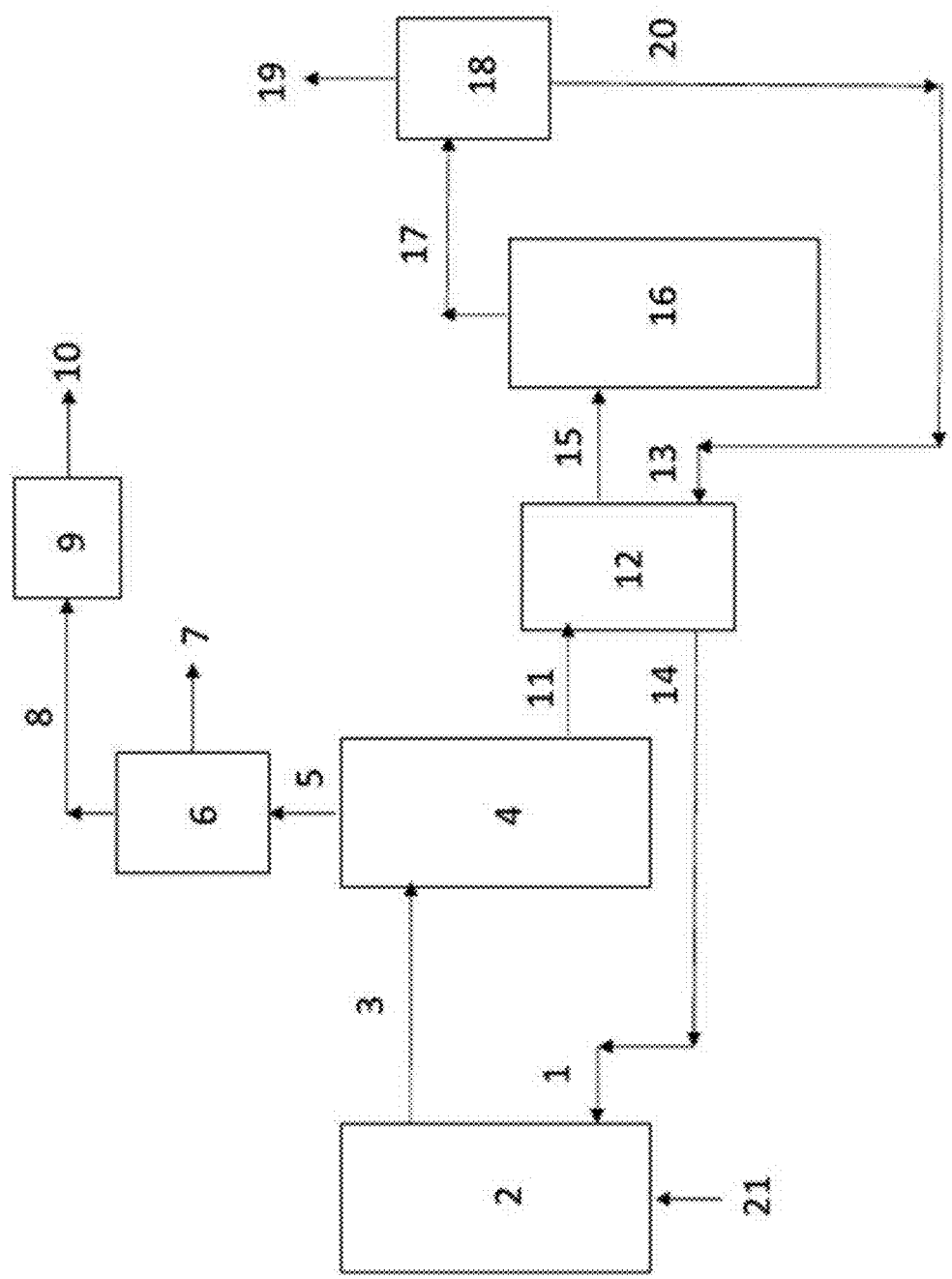
FIG. 14 depicts a schematic of another embodiment of an electrochemical reduction system for the conversion of CO or $CO_2$ to hydrocarbons.

In another embodiment, shown in FIG. 14, an electrolyte solution (1) is directed to a cathode unit (2) where RCPs may be produced. In some instances, the cathode unit may comprise a micro- or nanostructured membrane. In some instances, the cathode unit may comprise a micro- or nanostructured membrane comprising nitrogen doped carbon nanomaterials with copper nanoparticles. An RCP containing electrolyte stream (3) may be directed to an extractor (4). A substantially-purified RCP stream (5) may be directed to a collector (6), producing an RCP product stream (7). NCGs or other non-collected substances (8) may be directed to a subsequent separation unit(s) or process, such as a vacuum pump (9), becoming outlet stream (10). A post-extractor electrolyte stream (11) may be directed to an ion exchange (IX) membrane (12), where pH may be equilibrated between streams (11) and (13), producing streams (14) (cathode side), and (15) (anode side). Stream (15) may be directed to an anode unit (16), producing oxidized species rich stream (17), which may be directed to a separator device (here denoted VLS) (18), separating the oxidized species from the electrolyte stream (20), which may be reused as stream (13). Stream (14) becomes an electrolyte stream with desired characteristics (14) for reuse. A CO or $CO_2$ source (21), which may be substantially pure, may be introduced to the cathode membrane such that it is introduced to the active catalytic sites from the backing or lumen side of a membrane, which may result in a high availability and efficient utilization of the reactant at the catalyst sites. In some instances, the anode unit is in the same housing as the cathode unit. In some instances, the distance between the cathode and anode are minimized. In some cases, an ion exchange membrane is used between the cathode and anode. In some instances, the flows indicated are diffusive. In some instances, the flows indicated are recirculating flows intended to assist in the reduction of boundary layers and improve mass transport.

It shall be understood that the systems and processes for any described embodiment of the chemical reduction system may be utilized in any other embodiment of the chemical reduction system. For example, a particular cathode, anode, collector, extractor, contactor or vapor-liquid system may be applied to any embodiment of the chemical reduction system when appropriate. In some instances, the differences in system configuration for various embodiments may favor the selection of differing system components to produce optimal system performance and processing conditions.

Computer Systems

Figure 15:
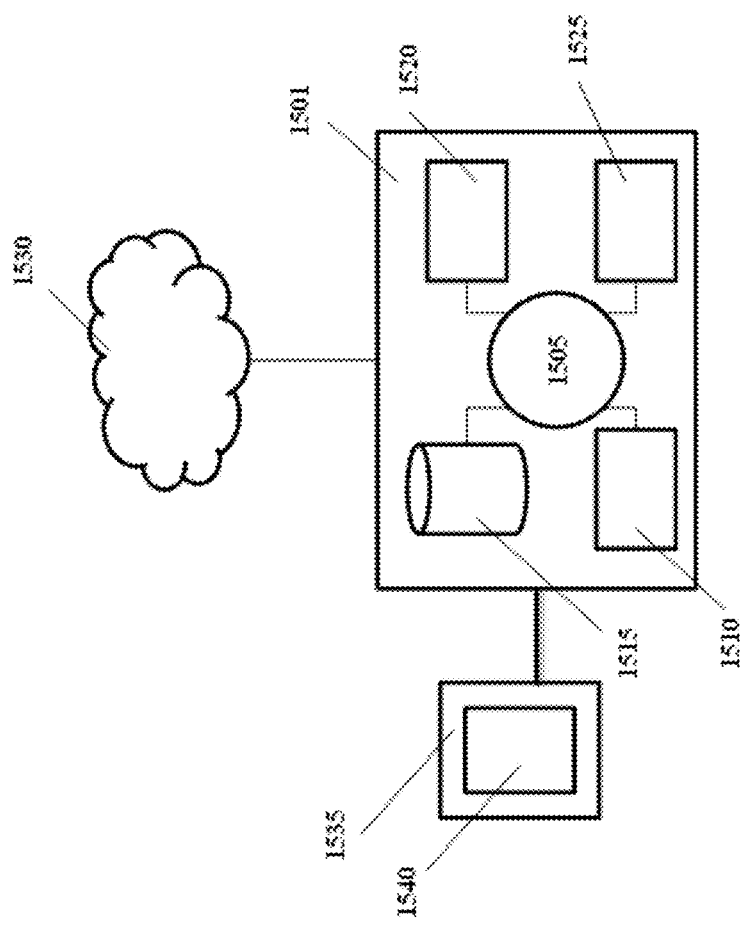
FIG. 15 illustrates a schematic of a computer system as utilized for the present invention.

The present disclosure provides computer systems that are programmed to implement methods of the disclosure. FIG. 15 shows a computer control system 1501 that is programmed or otherwise configured to control a chemical reduction system or a process within a chemical reduction system (e.g. controlling and balancing the pH of an electrolyte stream). The computer control system 1501 can regulate various aspects of the methods of the present disclosure, such as, for example, methods of producing a reduced carbon product or monitoring for potentially hazardous operating conditions. The computer control system 1501 can be implemented on an electronic device of a user or a computer system that is remotely located with respect to the electronic device. The electronic device can be a mobile electronic device.

The computer system 1501 includes a central processing unit (CPU, also "processor" and "computer processor" herein) 1505, which can be a single core or multi core processor, or a plurality of processors for parallel processing. The computer control system 1501 also includes memory or memory location 1510 (e.g., random-access memory, read-only memory, flash memory), electronic storage unit 1515 (e.g., hard disk), communication interface 1520 (e.g., network adapter) for communicating with one or more other systems, and peripheral devices 1525, such as cache, other memory, data storage and/or electronic display adapters. The memory 1510, storage unit 1515, interface 1520 and peripheral devices 1525 are in communication with the CPU 1505 through a communication bus (solid lines), such as a motherboard. The storage unit 1515 can be a data storage unit (or data repository) for storing data. The computer control system 1501 can be operatively coupled to a computer network ("network") 1530 with the aid of the communication interface 1520. The network 1530 can be the Internet, an internet and/or extranet, or an intranet and/or extranet that is in communication with the Internet. The network 1530 in some cases is a telecommunication and/or data network. The network 1530 can include one or more computer servers, which can enable distributed computing, such as cloud computing. The network 1530, in some cases with the aid of the computer system 1501, can implement a peer-to-peer network, which may enable devices coupled to the computer system 1501 to behave as a client or a server.

The CPU 1505 can execute a sequence of machine-readable instructions, which can be embodied in a program or software. The instructions may be stored in a memory location, such as the memory 1510. The instructions can be directed to the CPU 1505, which can subsequently program or otherwise configure the CPU 1505 to implement methods of the present disclosure. Examples of operations performed by the CPU 1505 can include fetch, decode, execute, and writeback.

The CPU 1505 can be part of a circuit, such as an integrated circuit. One or more other components of the system 1501 can be included in the circuit. In some cases, the circuit is an application specific integrated circuit (ASIC).

The storage unit 1515 can store files, such as drivers, libraries and saved programs. The storage unit 1515 can store user data, e.g., user preferences and user programs. The computer system 1501 in some cases can include one or more additional data storage units that are external to the computer system 1501, such as located on a remote server that is in communication with the computer system 1501 through an intranet or the Internet.

The computer system 1501 can communicate with one or more remote computer systems through the network 1530. For instance, the computer system 1501 can communicate with a remote computer system of a user (e.g., a user controlling the manufacture of a slurry coated substrate). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1501 via the network 1530.

Methods as described herein can be implemented by way of machine (e.g., computer processor) executable code stored on an electronic storage location of the computer system 1501, such as, for example, on the memory 1510 or electronic storage unit 1515. The machine executable or machine readable code can be provided in the form of software. During use, the code can be executed by the processor 1505. In some cases, the code can be retrieved from the storage unit 1515 and stored on the memory 1510 for ready access by the processor 1505. In some situations, the electronic storage unit 1515 can be precluded, and machine-executable instructions are stored on memory 1510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1501 can include or be in communication with an electronic display 1535 that comprises a user interface (UI) 1540 for providing, for example, parameters for producing a reduced carbon product. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1505. The algorithm can, for example, regulate the flow rate of a gas stream comprising CO2 through a contactor unit to optimize the pH or bicarbonate concentration of an electrolyte solution. As another example, the algorithm can regulate the electric field applied to a micro- or nanostructured membrane to control the selectivity of the membrane for a particular chemical species.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for using a carbon-containing material to generate a carbon product comprising one or more carbon atoms (C1+ product), comprising:
   (a) providing an electrochemical system comprising a first compartment, a second compartment, and a separation unit comprising (i) an anode, (ii) a cathode, and (iii) a micro- or nanostructured membrane comprising pores, wherein said cathode comprises a catalyst(s), wherein said separation unit separates said first compartment and said second compartment, and wherein said first compartment is in fluid communication with said second compartment through said pores;
   (b) directing an electrolyte solution comprising said carbon-containing material into said first compartment, to bring said electrolyte solution in contact with said cathode, wherein said anode and said cathode are in electrical communication with one another through said electrolyte solution, and wherein a voltage is applied between said cathode and said anode;
   (c) using said catalyst(s) to reduce said carbon-containing material in said electrolyte solution while said voltage is applied between said cathode and said anode, to generate said C1+ product which C1+ product is directed through said pores to said second compartment; and
   (d) recovering said C1+ product from said second compartment of said electrochemical system.

2. The method of claim 1, wherein said carbon-containing material comprises carbon monoxide (CO) and/or carbon dioxide ($CO_2$).

3. The method of claim 1, wherein said anode comprises catalyst(s).

4. The method of claim 1, wherein said electrolyte solution comprises an aqueous species resulting from an interaction of said carbon-containing material with water.

5. The method of claim 4, wherein said aqueous species comprises one or more members selected from the group consisting of bicarbonate ions, carbonate ions, and formate ions.

6. The method of claim 1, further comprising, prior to (b), introducing said carbon-containing material to water using a gas contactor.

7. The method of claim 6, wherein said gas contactor comprises a membrane.

8. The method of claim 7, wherein said membrane comprises one or more nanomaterials selected from the group consisting of carbon nanotubes, carbon nanospheres, carbon nano-onions, graphene, and porous pyrolyzed carbon.

9. The method of claim 1, wherein said micro- or nanostructured membrane comprises one or more materials selected from the group consisting of carbon nanotubes, carbon nanospheres, carbon nano-onions, graphene, and porous pyrolyzed carbon.

10. The method of claim 9, wherein said micro- or nanostructured membrane further comprises a catalyst.

11. The method of claim 10, wherein said catalyst comprises metal nanoparticles.

12. The method of claim 11, wherein said metal nanoparticles comprise a metal selected from the group consisting of copper, nickel, platinum, iridium, ruthenium, palladium, tin, silver, and gold.

13. The method of claim 1, wherein said catalyst(s) is N-doped.

14. The method of claim 1, wherein a source of said voltage comprises a renewable power source.

15. The method of claim 14, wherein said renewable power source comprises one or members selected from the group consisting of photovoltaic power, wind power, geothermal power, hydroelectric power, tidal power, and nuclear power.

16. The method of claim 1, further comprising introducing the carbon-containing material to the electrochemical system by using hydroxides generated electrochemically.

17. The method of claim 1, wherein said cathode operates at a temperature from about 10° Celsius (C) to 40° C.

18. The method of claim 1, wherein said C1+ product is recovered from said electrochemical reduction system in absence of a distillation unit.

19. The method of claim 1, wherein said electrochemical system further comprises an ion exchange membrane configured to minimize a distance between said cathode and said anode.

20. The method of claim 1, wherein said C1+ product is recovered from said electrochemical reduction system at a single pass selectivity of at least about 70%.

21. The method of claim 1, wherein said cathode comprises pores with pore sizes of no more than about 5 microns.

22. The method of claim 1, wherein said C1+ product comprises one or more members selected from the group consisting of methanol, ethanol, propanol, and butanol.

23. The method of claim 1, wherein said pores have diameters of no more than about 5 microns.

24. The method of claim 23, wherein said diameters are no more than about 500 nanometers.

25. The method of claim 24, wherein said diameters are no more than about 100 nanometers.

26. The method of claim 25, wherein said diameters are no more than about 50 nanometers.

27. The method of claim 26, wherein said diameters are no more than about 10 nanometers.

28. The method of claim 27, wherein said diameters are no more than about 5 nanometers.

29. The method of claim 1, wherein said C1+product comprises a plurality of members selected from the group consisting of methanol, ethanol, propanol, and butanol.

* * * * *